Nov. 12, 1963 J. C. GIBSON ET AL 3,110,885

COMBINED SWITCHING AND ADJUSTING SYSTEM

Filed March 17, 1958 15 Sheets-Sheet 1

INVENTORS:
JOHN C. GIBSON
THERON L. BOWERS
BY
Kegan, Bellamy & Kegan
ATT'YS.

COMBINED SWITCHING AND ADJUSTING SYSTEM
Filed March 17, 1958 15 Sheets-Sheet 2
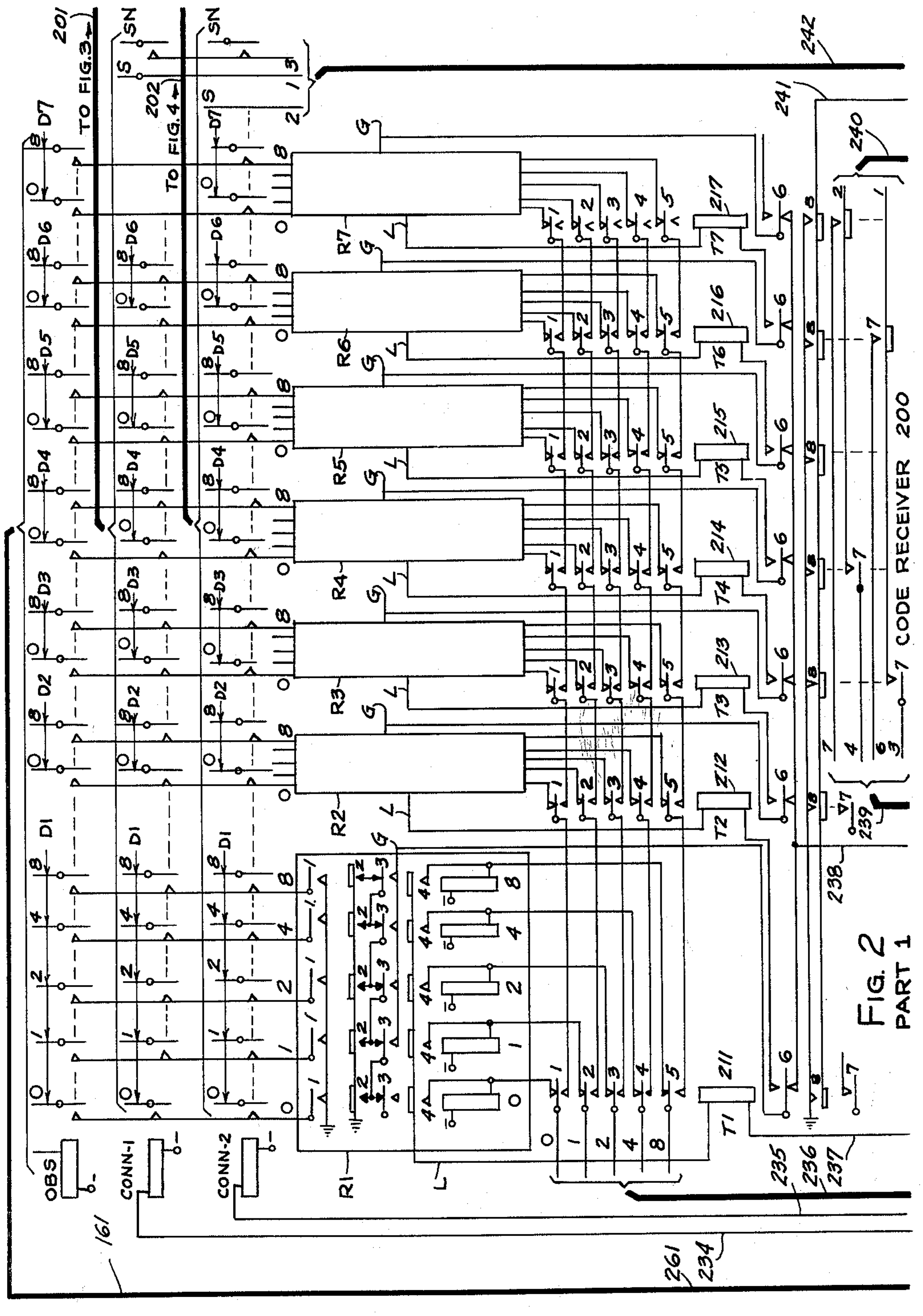
FIG. 2 PART 1

Nov. 12, 1963 J. C. GIBSON ET AL 3,110,885
COMBINED SWITCHING AND ADJUSTING SYSTEM
Filed March 17, 1958 15 Sheets-Sheet 3
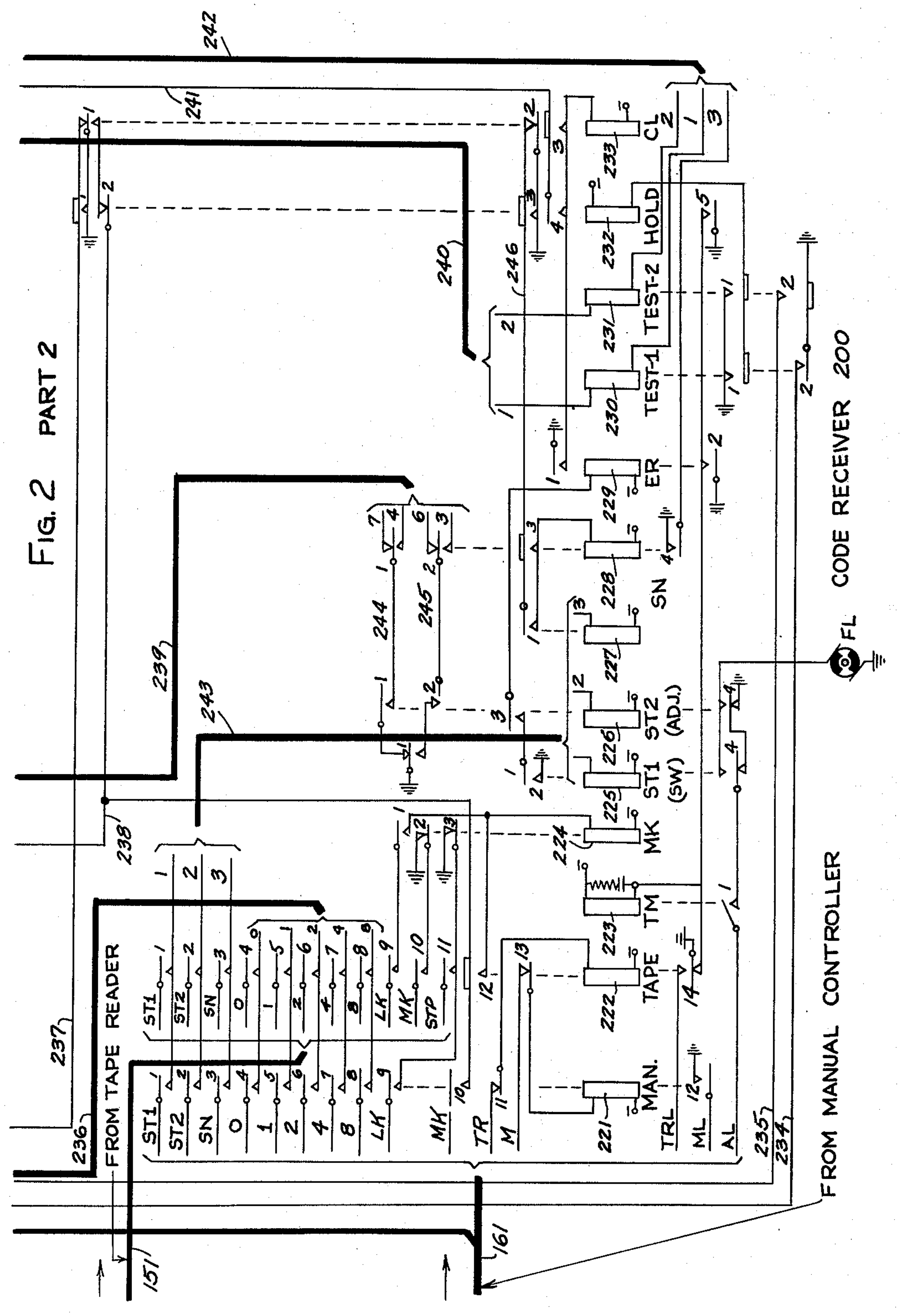
FIG. 2 PART 2

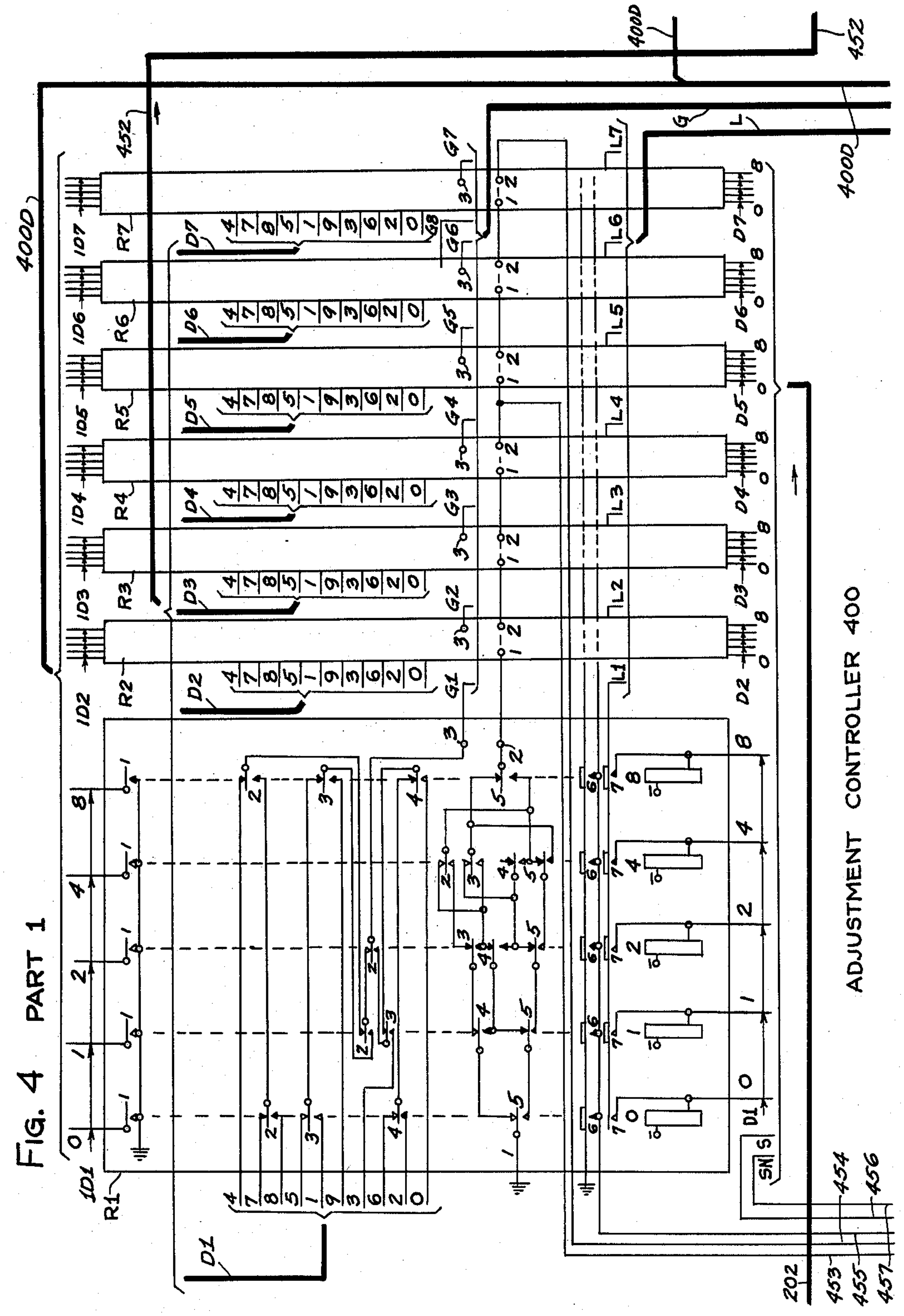
FIG. 4 PART 1

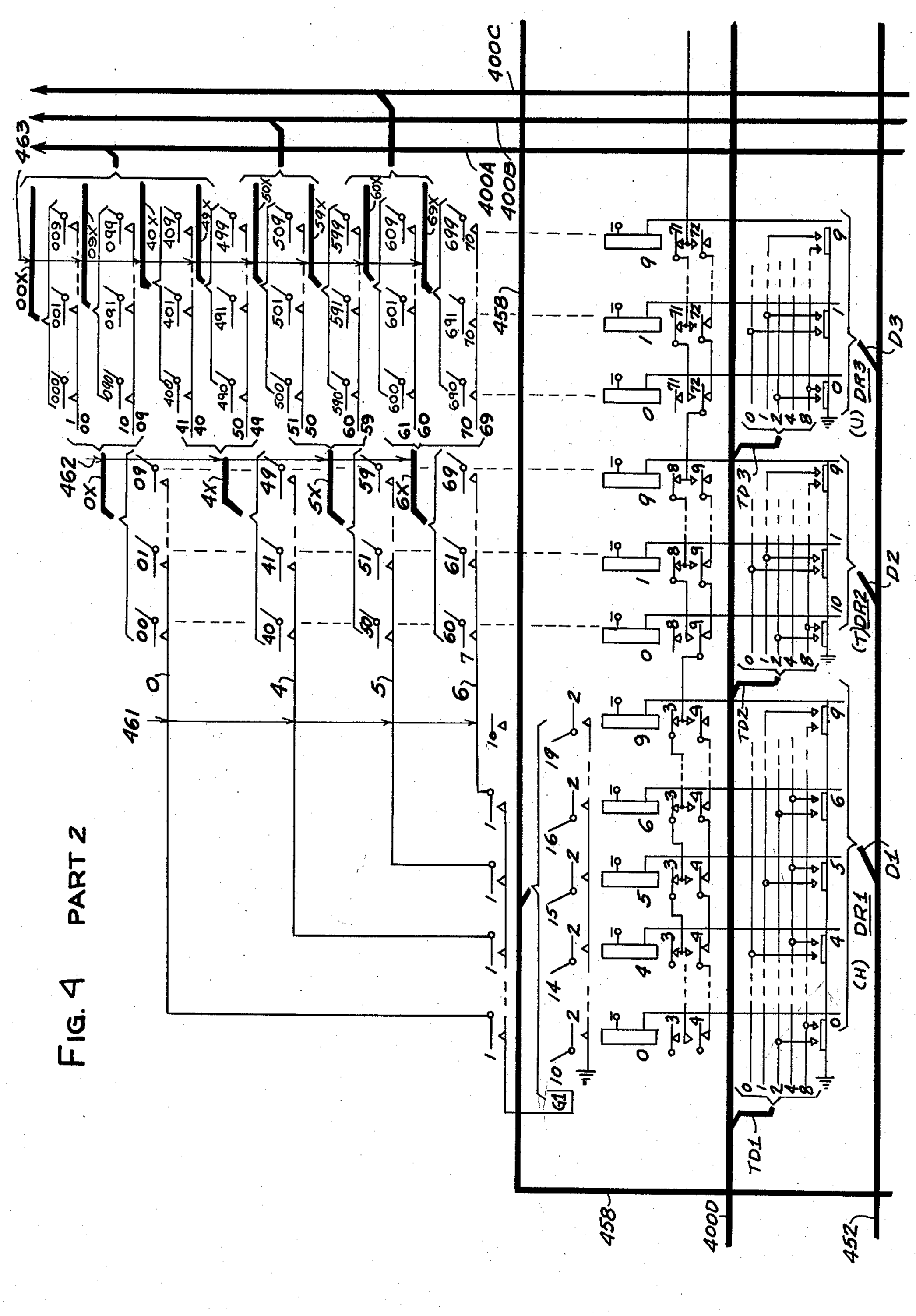
FIG. 4 PART 2

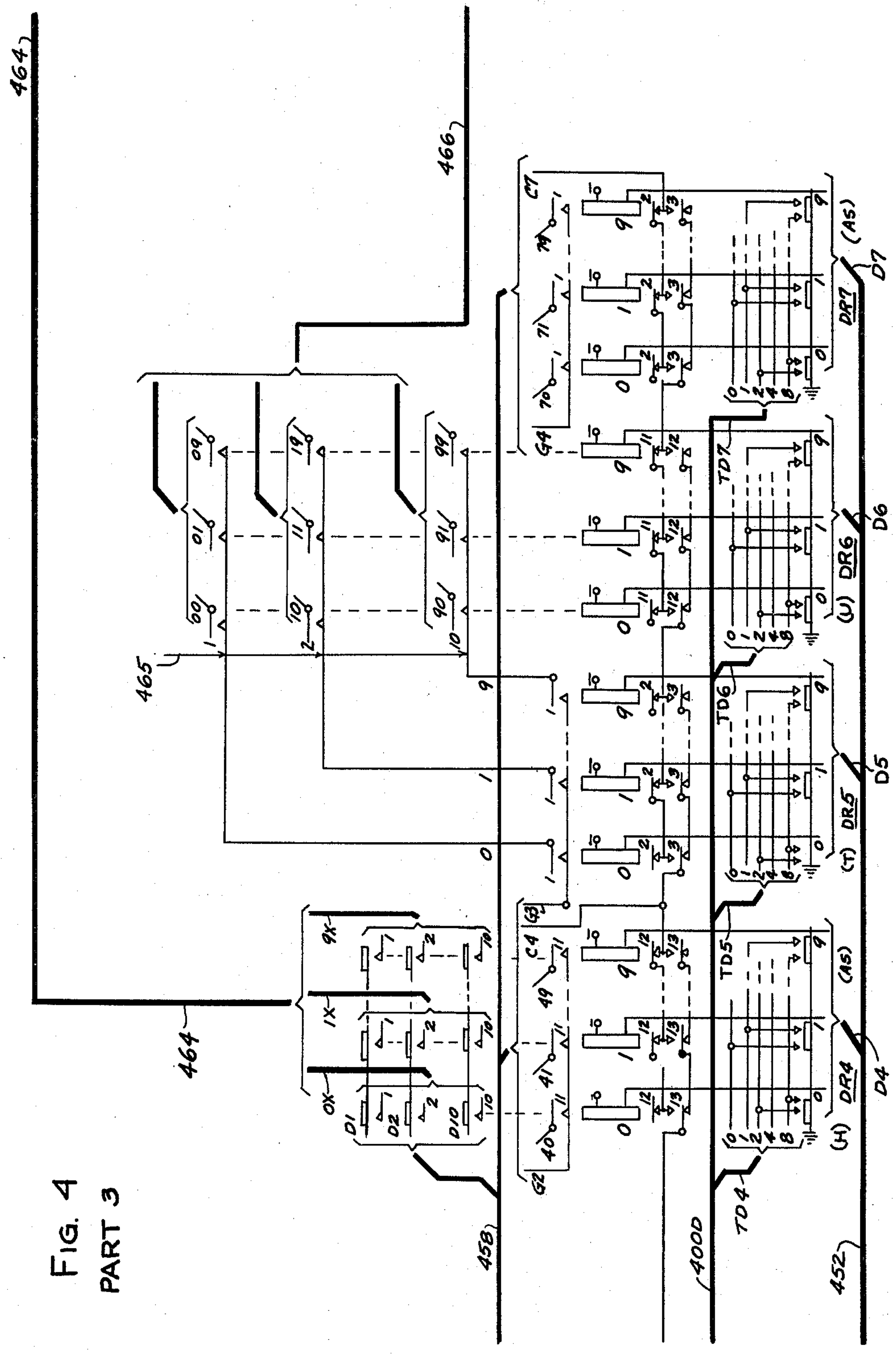
FIG. 4 PART 3

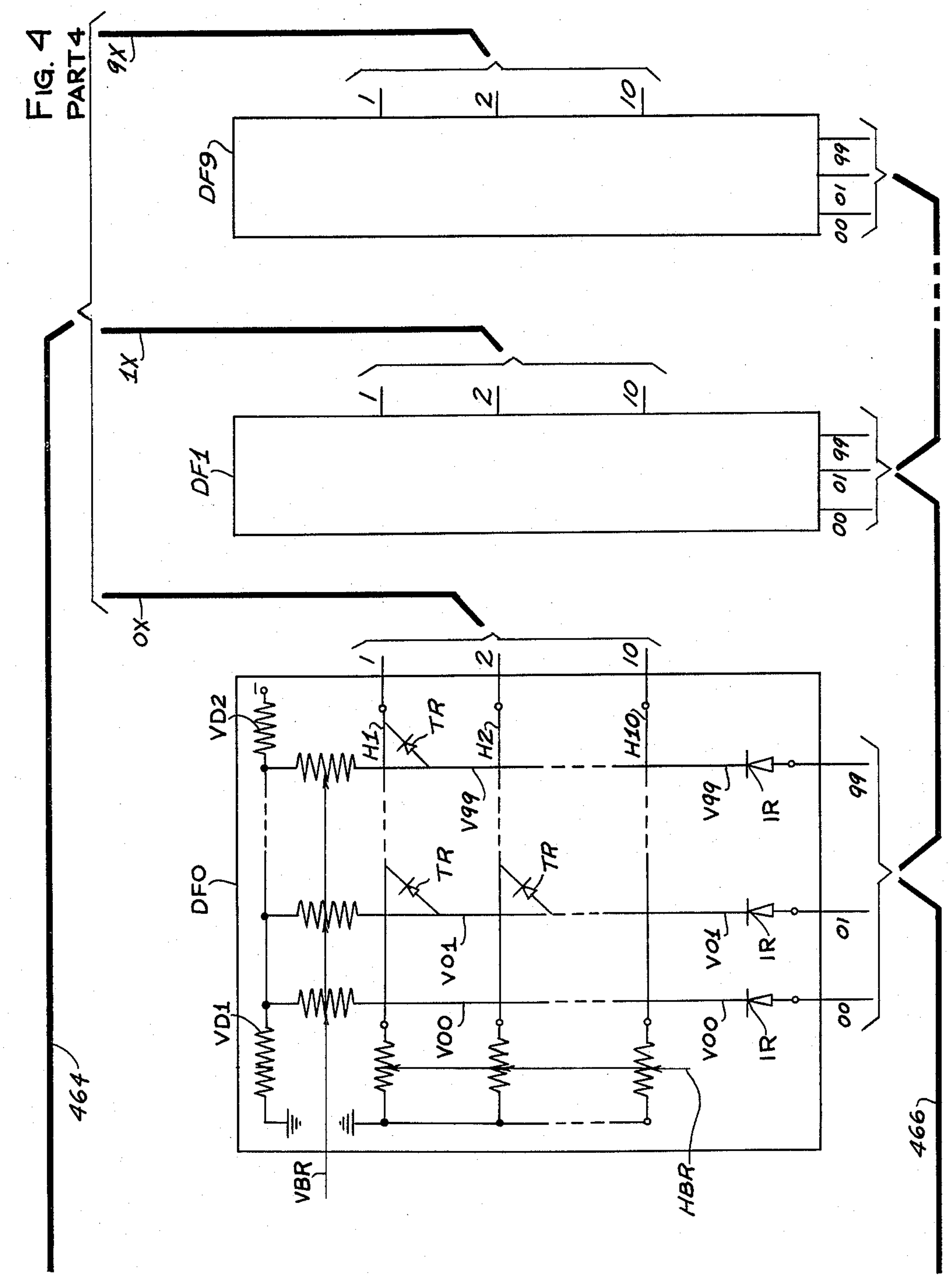
FIG. 4 PART 4

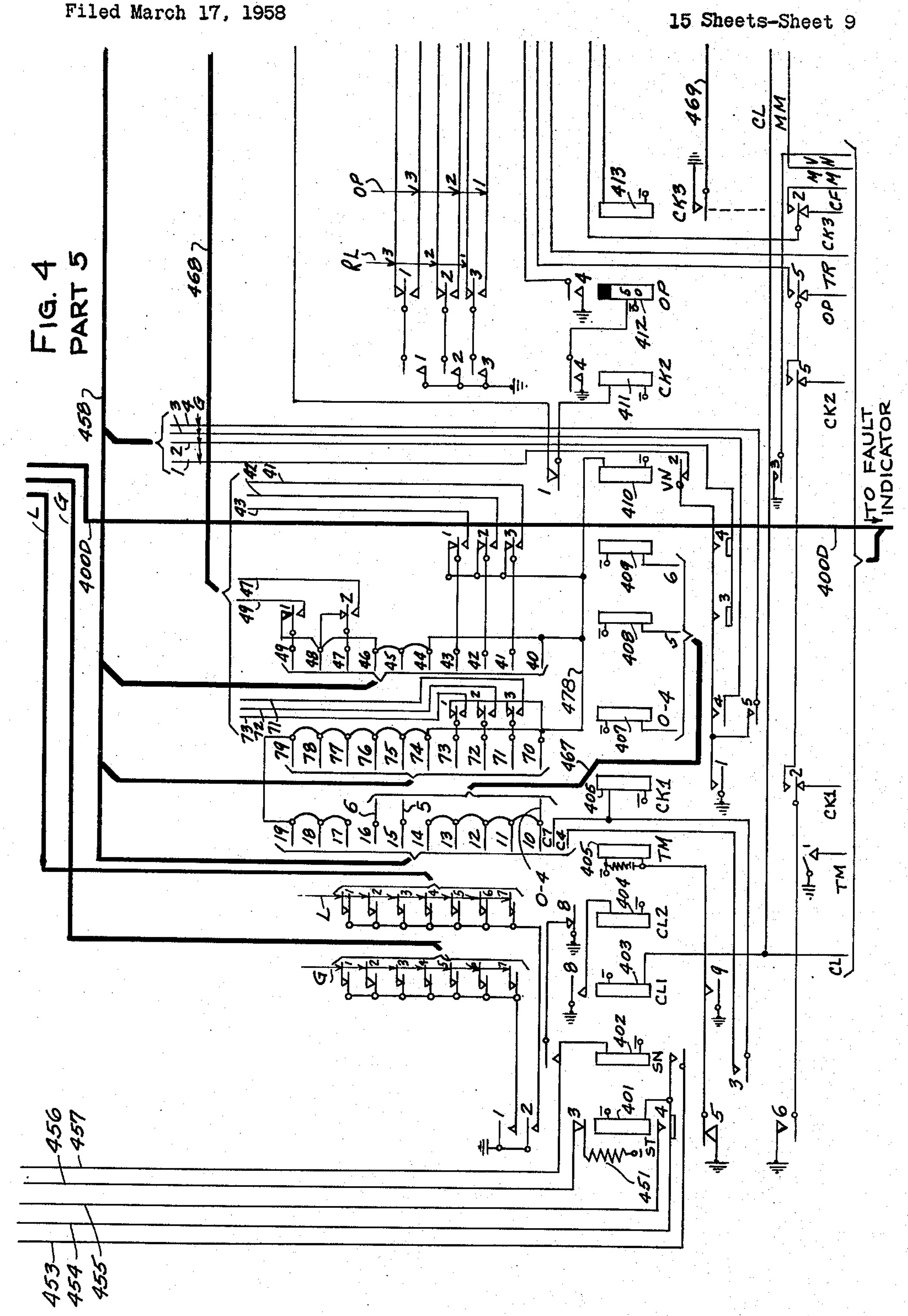
FIG. 4 PART 5

Nov. 12, 1963 J. C. GIBSON ET AL 3,110,885
COMBINED SWITCHING AND ADJUSTING SYSTEM
Filed March 17, 1958 15 Sheets-Sheet 10
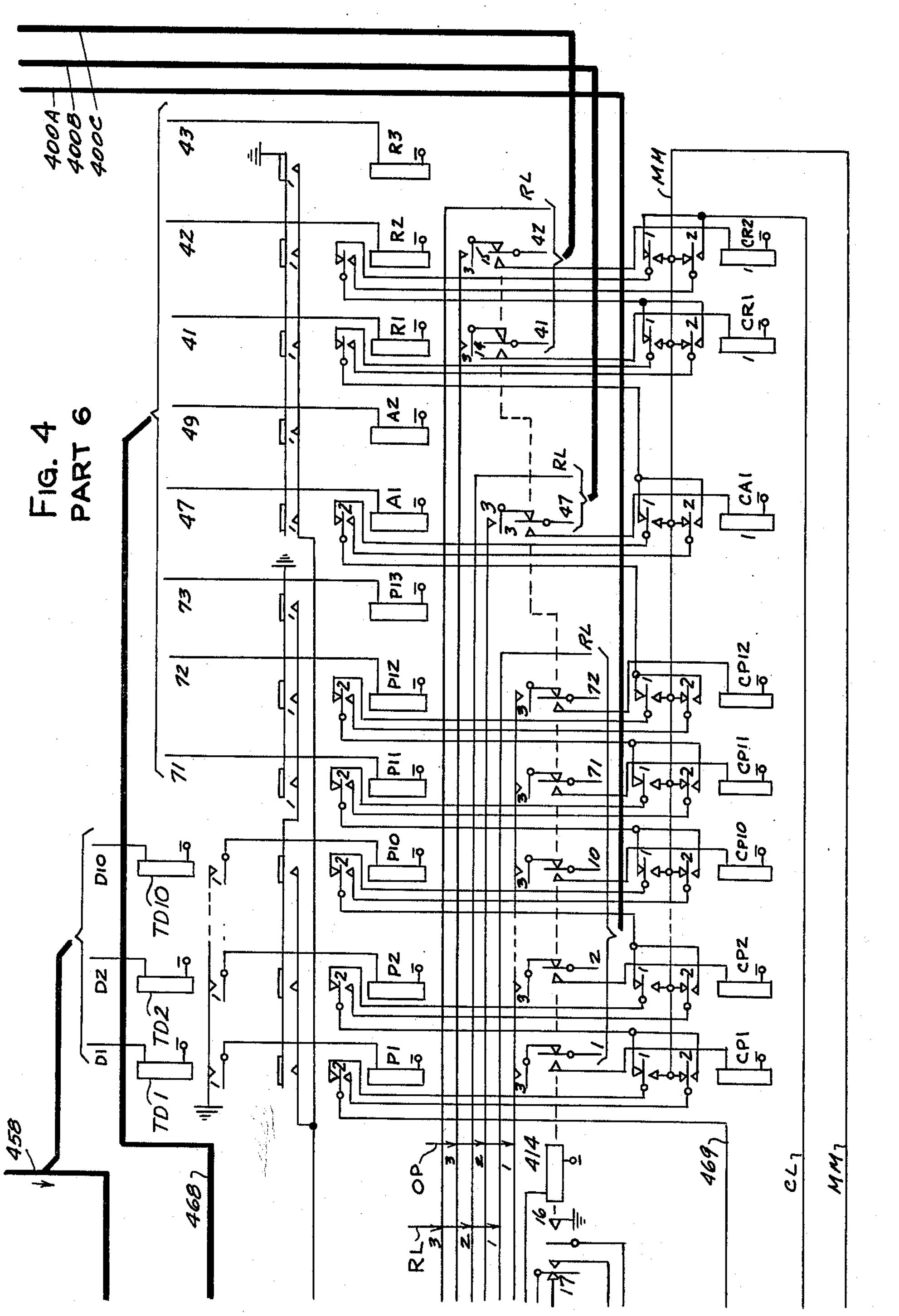
FIG. 4 PART 6

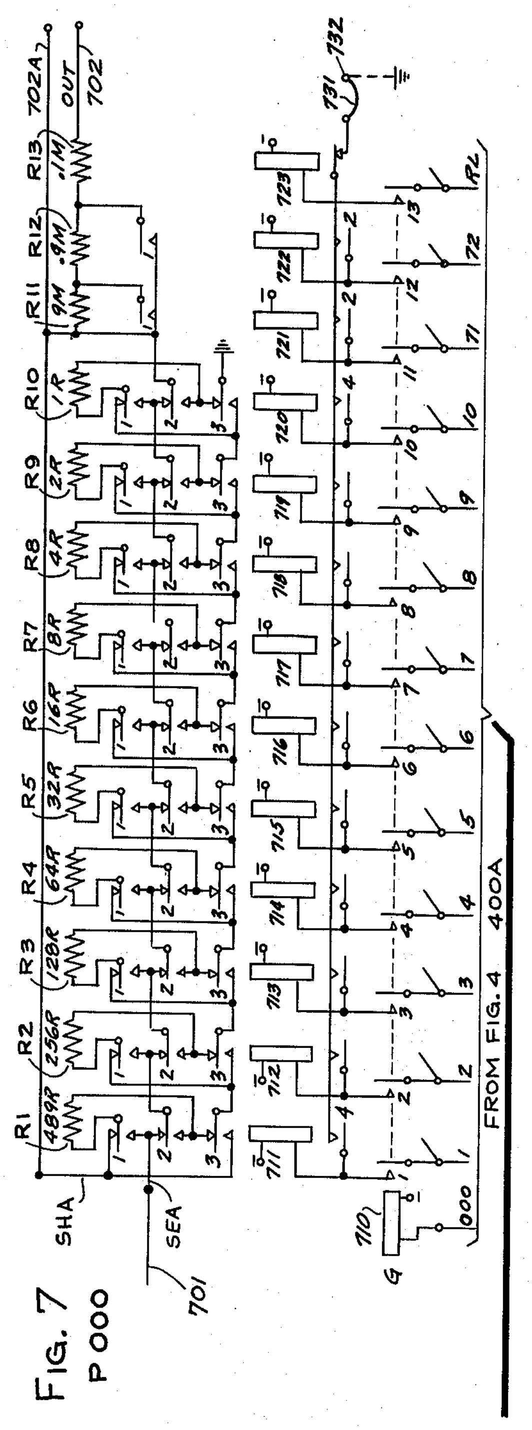
FIG. 7 P 000
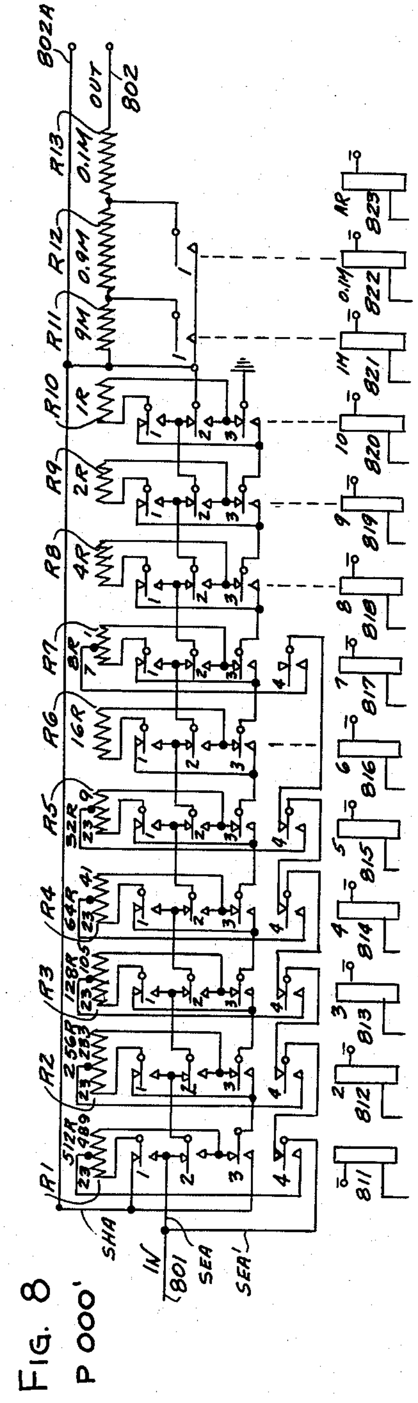
FIG. 8 P 000'

Nov. 12, 1963 J. C. GIBSON ET AL 3,110,885

COMBINED SWITCHING AND ADJUSTING SYSTEM

Filed March 17, 1958 15 Sheets-Sheet 13

Nov. 12, 1963 J. C. GIBSON ET AL 3,110,885

COMBINED SWITCHING AND ADJUSTING SYSTEM

Filed March 17, 1958 15 Sheets-Sheet 14

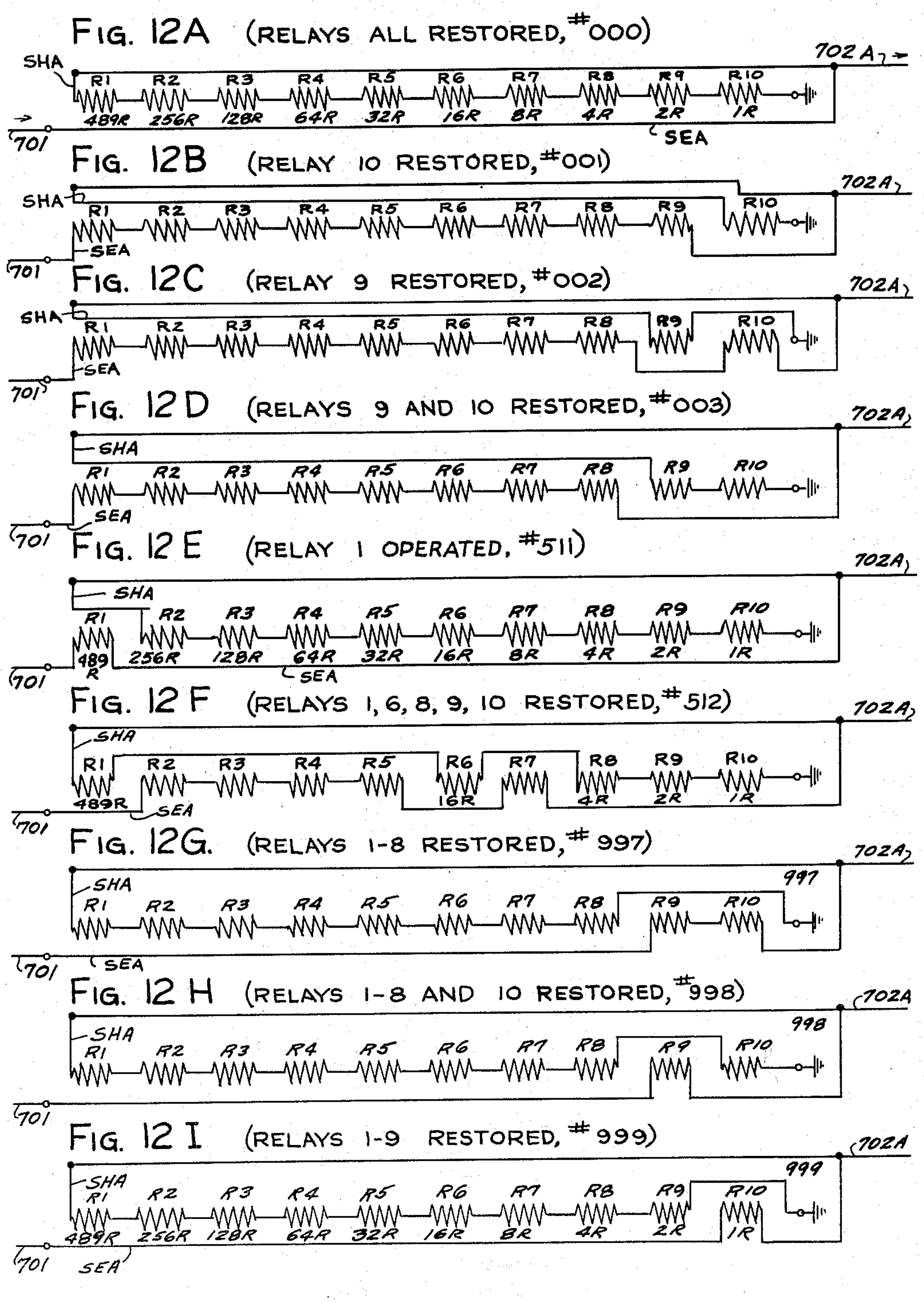
FIG. 12A (RELAYS ALL RESTORED, #000), FIG. 12B (RELAY 10 RESTORED, #001), FIG. 12C (RELAY 9 RESTORED, #002), FIG. 12D (RELAYS 9 AND 10 RESTORED, #003), FIG. 12E (RELAY 1 OPERATED, #511), FIG. 12F (RELAYS 1, 6, 8, 9, 10 RESTORED, #512), FIG. 12G. (RELAYS 1-8 RESTORED, # 997), FIG. 12H (RELAYS 1-8 AND 10 RESTORED, #998), FIG. 12I (RELAYS 1-9 RESTORED, # 999)

United States Patent Office 3,110,885 Patented Nov. 12, 1963

3,110,885
COMBINED SWITCHING AND ADJUSTING SYSTEM

John C. Gibson, Oak Lawn, and Theron L. Bowers, Western Springs, Ill., assignors to International Telephone and Telegraph Corporation, New York, N.Y., a corporation of Maryland Filed Mar. 17, 1958, Ser. No. 721,786
21 Claims. (Cl. 340—147)

This invention relates to a combined switching and adjusting system, being concerned more particularly with a system of that character which provides for (1) the interconnection of communication or information lines and associated apparatus units into such readily changeable groupings as may be from time to time desired, and for (2) the making of such readily changeable adjustments to adjustable units of an interconnected group as may be from time to time desired.

Although the system of the invention is capable of other uses, it is herein disclosed specifically as arranged for an analogue computer system wherein varying interconnections are required from time to time among the channels and components thereof, with many of the components being adjustable and requiring adjustment changes from time to time.

Heretofore, the interconnections required from time to time among the channels and components of an analogue computer system have largely been made manually, as by inserting the plugs of patching cords between jacks representing terminations of the respective channels and components, and the adjustments required from time to time have also been made manually, requiring adjusters to travel from one to the other of the components to effect the desired adjustments. Because of the relatively large number of connections required and the relative frequency at which they are to be changed, and because of the relatively large number of adjustable units employed and the relative frequency at which they require adjustment changes, the operation of an analogue computer system of any reasonable complexity has heretofore been a cumbersome and laborious time-consuming task.

According to the invention, the time and effort heretofore required for effecting the required interconnection changes manually, and for effecting the desired adjustments manually, has largely been overcome by providing switching apparatus and adjustment apparatus, both remotely controllable according to a predetermined program, which can be altered, enlarged upon, or otherwise changed from time to time as required.

One feature of the invention is that a desired program of interconnections and/or adjustments may be recorded in advance, as by a record of successive numbers on a tape, with each such number indicating a connection or an adjustment to be made or changed, in combination with automatic control apparatus for promptly and efficiently effecting the desired connection, adjustment, or change of either.

According to a further feature, the numbers of a recorded program, with the digits recorded in code, are received in succession at a code receiver from which they are transmitted (1) to a switch controller for those numbers pertaining to a switching operation, and (2) to an adjustment controller for those numbers pertaining to an adjustment operation, with each controller having conductor groups extending therefrom over which it exercises its number-directed controlling operations.

An associated feature is that, whereas the code receiver receives and stores in succession the digit signals pertaining to a number, it transmits to the pertaining controller all of the digit signals of the stored number simultaneously, following which the code receiver is cleared out to receive the signals corresponding to the next succeeding number while the controller to which the digit signals have been sent is exercising its control operations.

In view of the errors which would be introduced in the computer results by connections, adjustments, or changes in either, other than those specifically intended, it is an object of the invention to introduce in the code receiver, and in the switch and adjustment controllers, checking apparatus providing ample safeguards against erroneous operation resulting either from the incorrect transmittal of number information to, or to a malfunctioning of apparatus within, the code receiver or either controller, as well as to provide safeguards against the malfunctioning of the connecting and adjustment apparatus.

An associated object is to provide adequate indicating and supervisory apparatus for notifying the attendant personnel as to the location and nature of any fault which interferes with the normal intended switching and/or adjustment operation of the system.

A further object is to permit ready sectionalization of the items of computer apparatus, to the end that the apparatus of each section may be assigned a separate computer problem or program, while providing for the rapid restoration to normal of the connecting and adjustment apparatus of any section when the problem program assigned to that section has been completed, thus preparing the section immediately for use in connection with a further computing program or problem.

The foregoing and other objects and features of this invention and the manner of attaining them will become more apparent and the invention will be best understood, by reference to the following description of an embodiment of the invention taken in conjunction with the accompanying drawings, comprising FIGS. 1 to 13, wherein:

FIG. 2 is a circuit diagram of code receiver 200 of FIG. 1;

FIG. 4 is a circuit diagram of the adjustment controller 400 of FIG. 1;

FIGS. 7 and 8 are circuit diagrams of respective embodiments of potentiometer P000 of FIG. 1;

FIG. 12 (views 12A to 12I) shows representative adjustment conditions of the adjustable potentiometer P000 of FIGS. 1, 7, and 9.

FIG. 1—THE SYSTEM ARRANGEMENT

Figure 1:
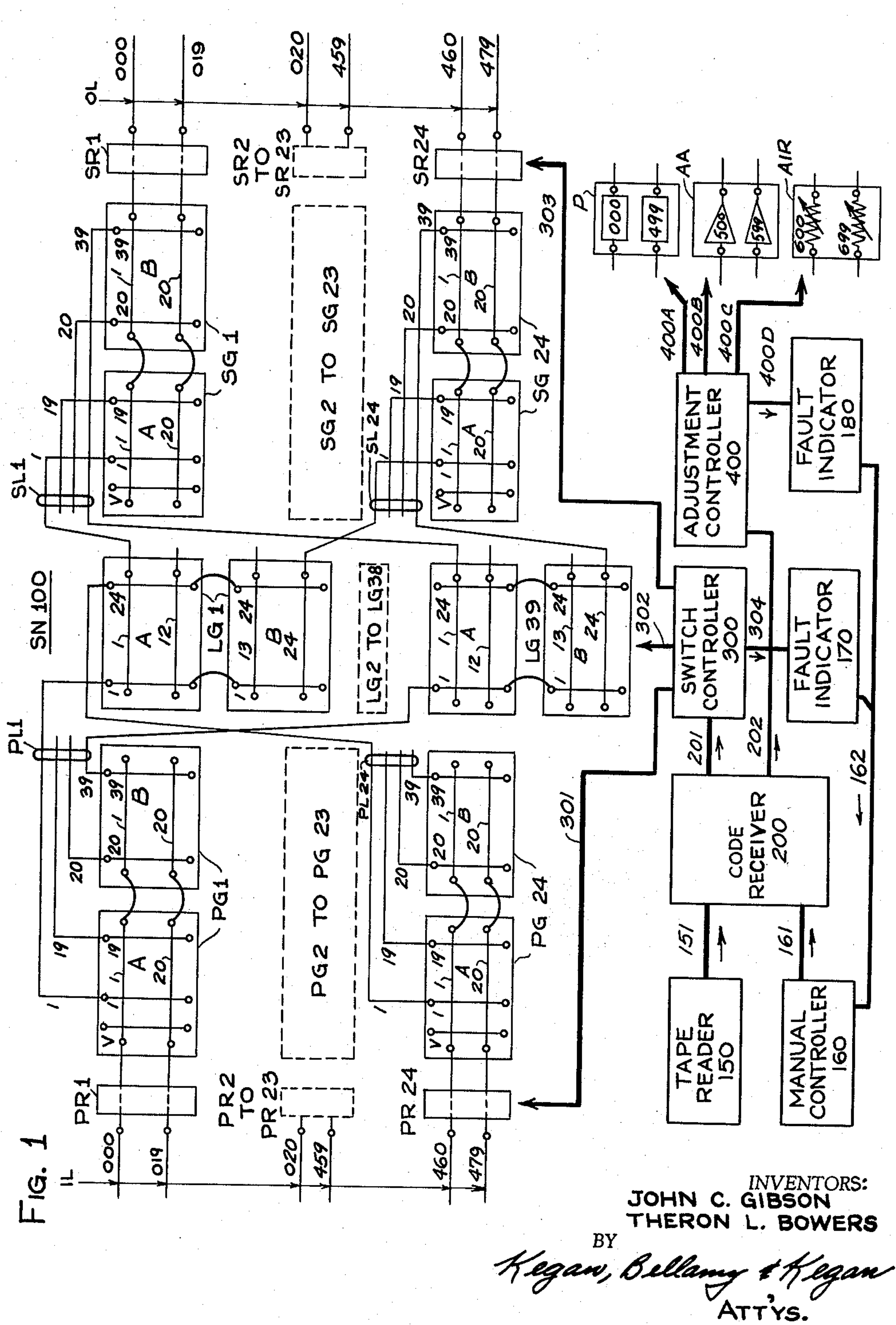
FIG. 1 is an overall diagram showing the general arrangement and interrelation of the system components.

FIG. 1 shows a switching network SN100 wherein 480 input lines IL are connectable by primary, link, and secondary switching apparatus respectively with desired ones of 480 output lines OL. The illustrated ones of the lines IL and OL are 000, 019, 020, 459, 460, and 480.

Figure 9:
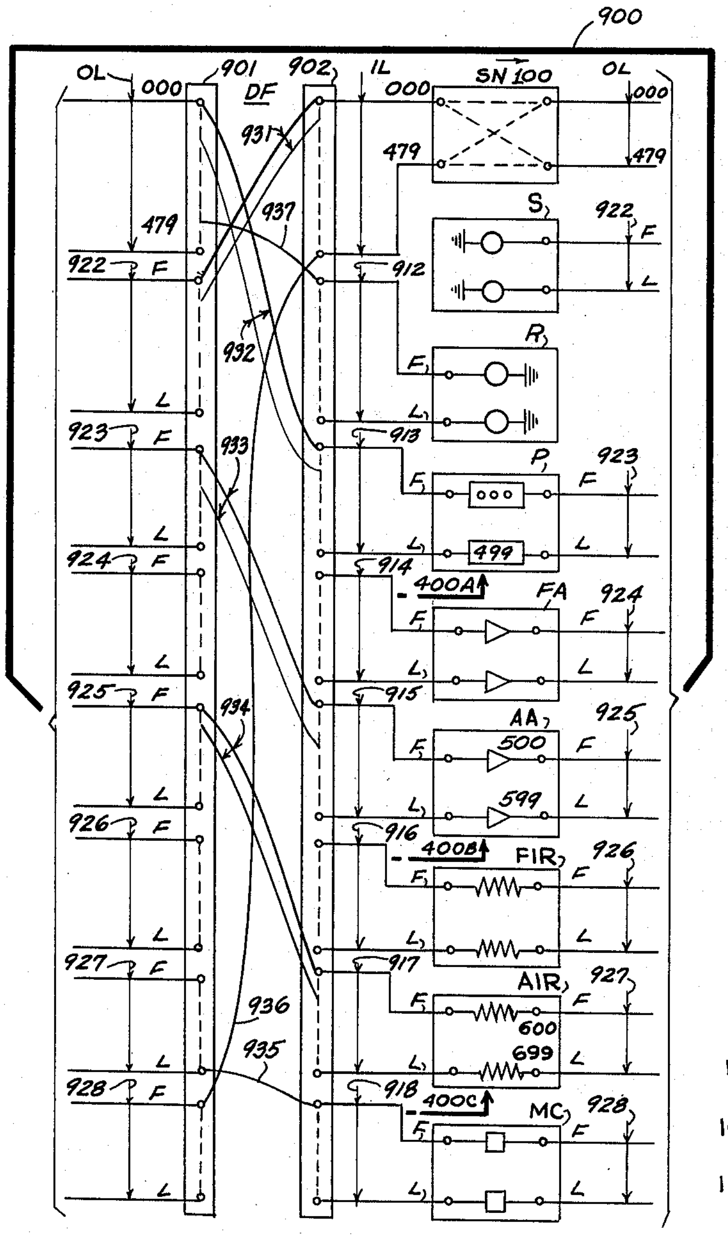
FIG. 9 is a cabling diagram showing the cabled wire connections by which the switching channels and computer components are brought to a distributing frame whereat they can be interconnected by jumpers as desired.

The input and output lines of SN100 are cabled to the distributing frame DF as shown in FIG. 9, whereat they can be extended by jumper connections to channels and components of computer apparatus which require being variably interconnected from time to time.

FIG. 1 also shows three groups (P, AA, and AIR) of adjustable computer components, comprising 500 potentiometers P, of which the first and the last (000 and 499) are shown; 100 adjustable amplifiers, of which the first and the last (500 and 599) are shown; and 100 adjustable input resistors, of which the first and the last (600 and 699) are shown. The showing of component groups P, AA, and AIR is repeated in the cabling diagram of FIG. 9, along with other computer components.

For switching purposes the input lines IL and the output lines OL are each divided into switching groups of twenty lines each. The input lines 000 to 019 comprise the first switching group of twenty, and they extend through primary relays PR1 to respective horizontal paths of primary switches A and B comprising primary group PG1. Primary relays PR1 include twenty individual line relays, such as primary line relay PLR of FIG. 11. The apparatus for handling the 2nd to the 23rd twenty-line group of input lines IL is indicated by dotted rectangles labeled PR2 to PR23 and SG2 to SG23. The 24th twenty-line group of lines IL is handled through primary relays PR24, through which the lines extend to the respective horizontals of switches A and B of primary group PG24.

Reference is made to our prior application Serial No. 701,824, filed December 10, 1957, for a Non-Blocking Link-Access Switching System, which discloses in circuit detail a switching system corresponding to switching network SN100 herein. As therein disclosed link service for the twenty-line groups served by the primary switching group is provided by a separate group of thirty-nine primary links for each such switching group. The primary links are shown at PL1 for group PG1 and at PL24 for group PG24.

Figure 11:
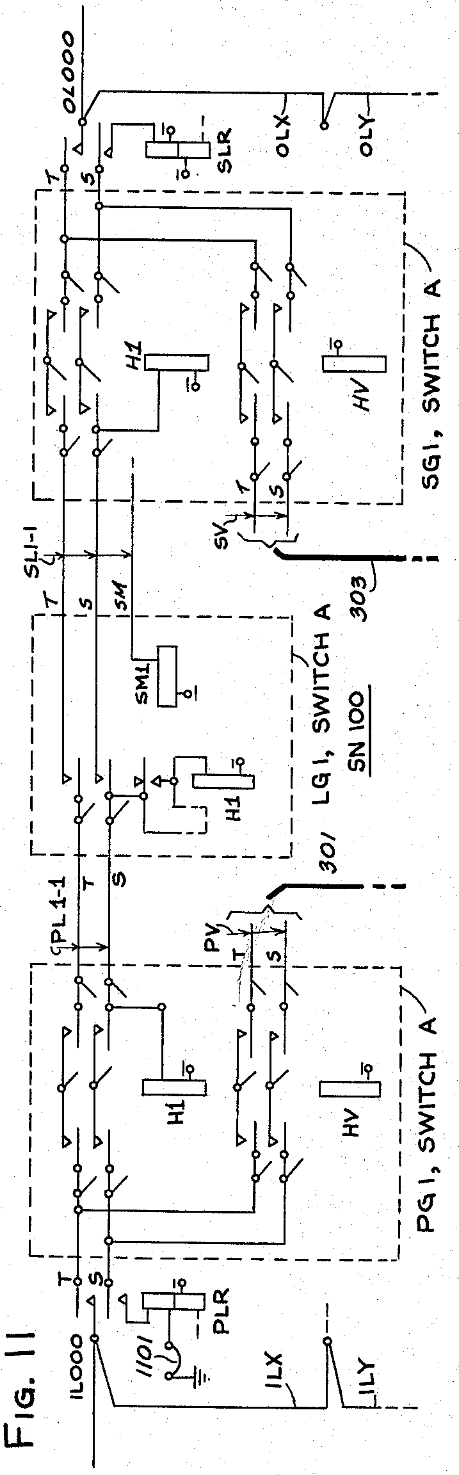
FIG. 11 is a call-through circuit diagram of a connection through the switching network SN100 of FIG. 1.

The output lines OL are similarly served in twenty-four twenty-line groups through secondary relays SR1 to SR24, one of which is shown at SLR in FIG. 11, and through twenty-four secondary switching groups SG1 to SG24, with each group including two secondary switches A and B. Secondary links SL1 serve the lines at SG1, and the links SL24 serve the lines at SG24.

Interconnection of the primary links as desired with the secondary links to effect the desired line-to-line interconnections is accomplished by thirty-nine link groups of switches A and B which are designated LG1 to LG39. At each link group LG, the twenty-four primary links from corresponding primary switches PG terminate on the verticals of each of the two link switches A and B, while the secondary links corresponding to any such link group terminate on the horizontals of the two link switches of the link group. The first twelve terminate on the horizontals of switch A of the group, while the final twelve terminate on the horizontals of switch B of the link group.

By way of a switching example, it will be noted that any line IL000 to IL019 served by primary group PG1 can be extended, through any one of its crosspoints of switches A and B of group PG1, and over any one of the thirty-nine links in group PL1 to the corresponding one of the link groups LG1 to LG39, whence the connection may be extended over a secondary link of any group SL1 to SL24, and thence by way of a crosspoint in the associated secondary group SG1 to SG24, to the desired outlet line OL000 to DL479.

The setting up of connections through the switching network SN100, together with such one-at-a-time taking down of established connections as may be desired, is accomplished from switch controller 300 over conductors in primary, link, and secondary groups of conductors 301, 302, and 303. The operation of switch controller 300 for this purpose is as described in our noted prior application, except as hereinafter described in connection with FIG. 3, which shows certain modifications of the switch controller, largely to adapt the controller for operation in the combined switching and adjustment system herein disclosed.

Figure 3:
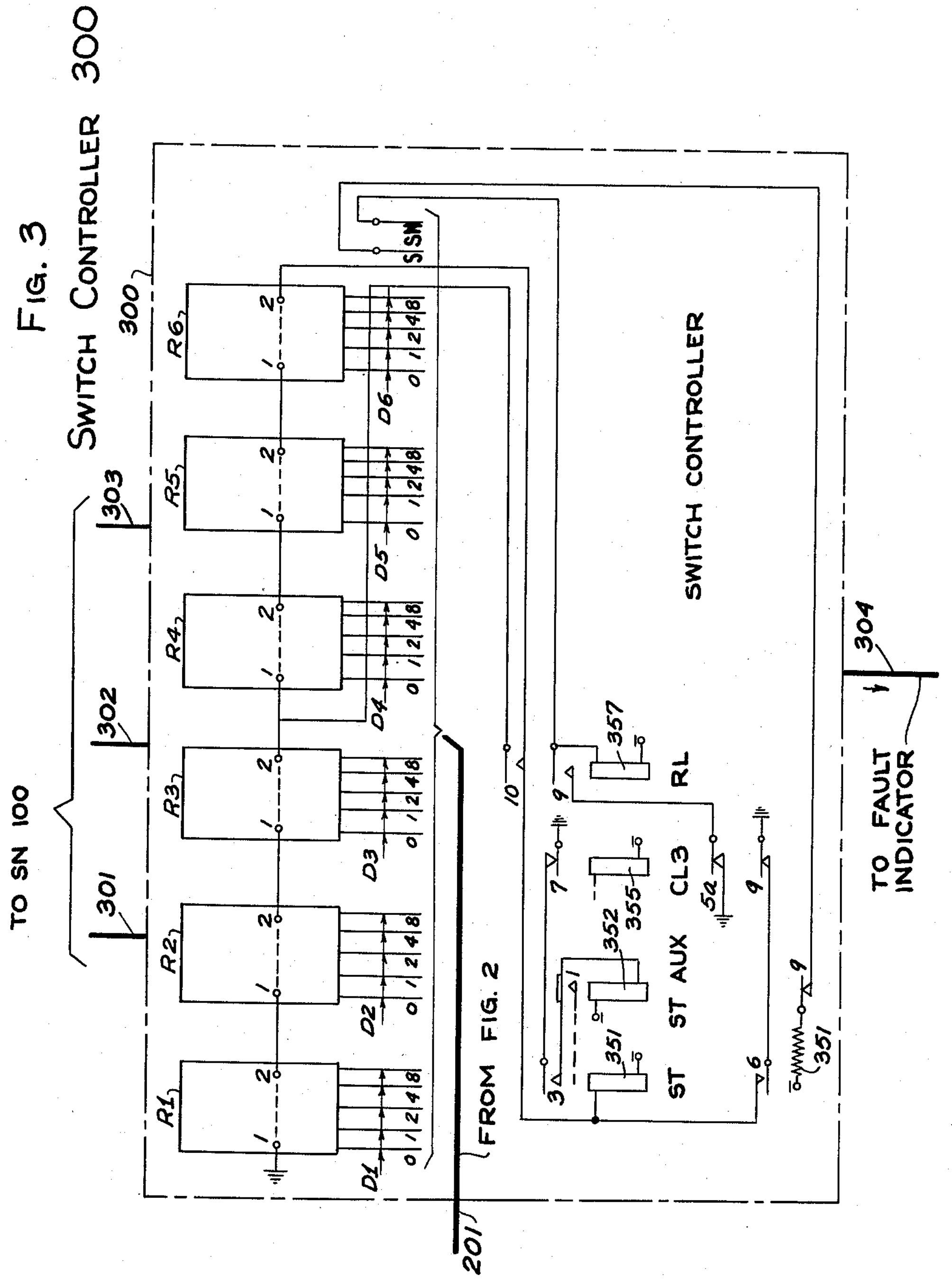
FIG. 3 is a circuit diagram of the significant part of switch controller 300 of FIG. 1.

Switch controller 300 of FIGS. 1 and 3 is controlled over conductor group 201 by code receiver 200 of FIGS. 1 and 2, which is controlled over conductor group 151 by tape reader 150, or over conductor group 161 by manual controller 160.

Code receiver 200, when a control number received thereby indicates that an adjustment is to be effected, exercises a control over adjustment controller 400, by way of conductor group 202, instead of exercising the control over conductor group 201 for switch controller 300. Controller 400, depending upon the identity of the number received over 202, exercises an adjustment control, over one of the conductor groups 400A, 400B, and 400C, which extend respectively to adjustable component groups P, AA, and AIR.

Faults, including both erroneous number indications and erroneous equipment operation, which manifest themselves at the switch controller 300 cause appropriate signals to be transmitted over conductor group 304 to fault indicator 170, while adjustment controller 400 similarly transmits fault signals over conductor group 400D to fault indicator 180. Each of these fault indicators may be essentially similar to the fault indicators disclosed in our noted prior application. Fault signals from either of them are transmitted over conductor group 162 for suitable display at manual controller 160, which is essentially similar to the manual controller disclosed in detail in our noted prior application, differing in that it may require additional display lamps and control keys because of the addition of the adjustment controller 400, with its additional fault indicator 180.

FIG. 2—CODE RECEIVER 200

Referring particularly to FIG. 2, the code receiver 200 shown therein will now be described. This receiver is generally similar to the code receiver shown in our noted prior application, but is modified therefrom somewhat, primarily to permit it to perform the additional functions imposed thereon because of the addition of the adjustment controller 400.

Code receiver 200 comprises manual-connect and tape-connect relays 221 and 222; timer and mark relays 223 and 224; start relays 225 and 226, corresponding respectively to switching and to adjustment operations; short-number relays 227 and 228 which adapt the code receiver for handling numbers containing less than the maximum number of digits corresponding to a start-relay operation; error relay 229; test relays 230 and 231, which correspond respectively to switching and to adjustment operations; and hold and clearout relays 232 and 233.

Receiver 200 further comprises seven similar digit registers R1 to R7, of which only digit register R1 is shown in circuit detail, together with the respectively associated transfer relays 211 to 217.

Receiver 200 further comprises observation relay OBS which is operable from the manual controller 160 when an indication is desired at the manual controller of the coded digit information in the code receiver, and further comprises alternative connecting relays CONN–1 and CONN–2, which correspond respectively to switching operations and to adjustment operations.

Connecting relays 221 and 222 are operable in the alternative over conductors M and TR is group 161 associated with the manual controller 160, the selected conductor being grounded in the manual controller for that purpose. The grounding of conductor M in the manual controller when numbers are to be set up manually in the code receiver 200, at a time when tape relay 222 is restored, closes a circuit through contacts 13 of relay 222 for operating relay 221. Contacts 12 of relay 221 ground conductor ML to light the manual supervisory lamp (not shown) at the manual controller; contacts 11 disconnect relay 222 as an interlocking measure; and contacts 1 to 10 connect conductors ST1, ST2, SN, 0, 1, 2, 4, 8, LK, and MK in group 161 to the corresponding conductors local to the code receiver, thus placing the code receiver under the control of the keyboard apparatus (not shown) at the manual controller 160 to permit the code receiver to be controlled therefrom substantially as described in our noted prior application.

When the numbers of a program pre-recorded on tape substantially as described in our noted prior application are to be read by the code receiver 200 for processing by controllers 300 and 400, conductor TR in group 161 is grounded at the manual controller with relay 221 restored, thereby operating tape relay 222 through contacts 11 of relay 221. Front contact 14 of relay 222 grounds tape-reader lead TRL in group 161 to light a suitable indicating lamp (not shown) in manual controller 161; back contact 14 open-circuits timer relay 223, which is normally operated as indicated at its contacts 1, but relay 223 is arranged to remain operated after disconnection for the interval of a second or so required for the seven digits of a complete number to be received and retransmitted by the code receiver; contacts 13 of relay 222 disconnect relay 221 for interlocking purposes; contacts 12 prepare a circuit for mark relay 224; and contacts 1 to 11 connect conductors ST1, ST2, SN, 0 to 8, LK, MK, and STP of the tape reader conductor group 151 to respective local conductors of the code receiver; and contacts 12 extend conductor 238 to mark relay 224.

The five conductors 0, 1, 2, 4, and 8 in tape-reader group 151, and the corresponding conductors in local group 236, represent the five code elements of the two-out-of-five code signallying system employed for transmitting any digit into the code receiver, the code being according to the following code table:

*Two-Five Code Table*

| Digit | Code Elements |
|---|---|
| 0 | 2 . . 8 |
| 1 | 0 . . 1 |
| 2 | 0 . . 2 |
| 3 | 1 . . 2 |
| 4 | 0 . . 4 |
| 5 | 1 . . 4 |
| 6 | 2 . . 4 |
| 7 | 4 . . 8 |
| 8 | 0 . . 8 |
| 9 | 1 . . 8 |

In the above code table, the two code elements for any digit are added together, with one exception, to arrive at the digit value they represent. For example, code elements 2 and 8 represent the digit 0, considered as the number 10; code elements 0 and 1 indicate the digit 1, since their sum is 1; and so on to the digit 9, which is represented by code elements 1 and 8, their sum being 9. The noted exception is the digit 7, which is represented by a combination of the code elements 4 and 8.

When the tape reader is reading any digit frame of a correctly punched tape, precisely two of the five conductors 0 to 8 in group 151 are thereby grounded. The particular one of ten combinations of two conductors grounded depends upon the digit value being read.

Following the digit frames of a number, is a start frame, wherein the tape being read is punched for the transmission of a signal over one or the other of the start conductors ST1 and ST2 in group 151, corresponding respectively to a switching operation and to an adjustment operation.

When a short number is being transmitted, it is either a three-digit switching number (instead of a six) for indicating a connection to be released, or is a four-digit adjustment number (instead of a seven) indicating an adjustment of a device AA or AIR of FIG. 1. For any such short number, conductor SN becomes grounded at the tape reader either during a preliminary short-number frame or during one of the digit frames of the number, as a signal to the code receiver to check for a short number.

Conductors LK, MK, and STP in cable 151 are signal conductors for controlling the stepping operation of the tape reader as explained in detail in the noted prior application.

During the preparation of a program tape, or during editing thereof after preparation, an error may be discovered in the punching of any given number. Any such number is caused to be cancelled at the code receiver by adding to each digit frame thereof a punching for a double-start signal, over both of the start conductors ST1 and ST2, operating both of the start relays 225 and 226 as an error signal. The number thus cancelled by the code receiver may correctly appear later on the same tape, or may be applied to a supplemental tape.

When a tape is introduced into the code receiver, it preferably starts with a succession of error signals (double-start signals, perhaps three or four) which are employed to advance the tape a few steps into the tape reader for more reliable operation and to insure that the code receiver is cleared of any partially stored number.

With the tape (not shown) in its initial position, upon the described operation of tape relay 222, the closing of contacts 10 thereof places ground on conductor MK of group 151 through contacts 2 of mark relay 224, thereby causing the tape reader to read the first frame of the tape. A ground signal is thereupon received over each of the conductors ST1 and ST2 in group 151, grounding each of the conductors 1 and 2 in group 243 to operate both start relays 225 and 226. At their contacts 2 and 3, these relays operate error relay 229. Contacts 2 of relay 229 reclose the operate circuit of timer relay 223 to recharge the associated timing condenser and thus condition that relay for a new timing operation after the error relay has restored, and contacts 1 of error relay 229 operate clearout relay 233. Back contact 1 of relay 233 ungrounds hold conductor 237 to clear out any operated ones of the registers R1 to R7 and to release any operated ones of the associated transfer relays 211 to 217. Front contact 1 of relay 233, through contacts 2 of relay 232, grounds conductor 238, thereby operating mark relay 224 through contacts 12 of relay 222. At its contacts 1, mark relay 224 locks itself to the now-grounded locking conductor LK in group 151; and, at its contacts 2 and 3, it removes ground from conductors MK and STP associated with the tape reader, thereby causing the tape reader to end the mark on the currently associated frame of the tape and to advance the tape to present the next frame for reading. Start relays 225 and 226 thereupon restore and restore error relay 229, which in turn restores relays 233. The latter relay opens the initial circuit of mark relay 224, permitting that relay to restore under tape-reader control.

The foregoing operations (of relays 225, 226, 229, 233 and 224) are repeated for each preliminary double-start signal, whereby the tape is advanced step-by-step until the first digit frame of the tape reaches reading position.

When the first digit frame of the tape is read, ground signals appear on two of the five conductors 0 to 8 in group 151, thereby extending ground over two of the five conductors in local group 236, and thence through normally closed contacts of transfer relay 211 to the corresponding two of the five relays 0, 1, 2, 4, and 8 of register R1. These two relays of the register R1 thereupon operate, preparing signal paths at their contacts 1, and grounding the associated conductor G at their contacts 2 and 3. Each such register relay also closes a self-locking circuit at its contacts 4 in series with the associated transfer relay 211, to the normally grounded hold conductor 237. Substantially no current flows over the locking path for the time being because of the maintenance of the initial operating ground on the two operated relays of R1. The grounding of conductor G, which occurs through contacts 2 and 3 of any two of the relays R1 (and which also occurs if more than two relays are operated in a register, since the checking operating of the registers of the code receiver are for at least two-out-of-five signals), extends ground through back contact 6 of relay 211 to the advance-control conductor 238, thereby closing a circuit through contacts 12 of relay 222 for mark relay 224. Mark relay 224 thereupon operates to cause the tape reader to terminate the signals of the current frame and to advance the next frame to reading position as described.

When the signals of the current frame are terminated by the described operation of relay 224, the initial operating circuit of the operated relays of register R1 is opened, causing current to flow through the locking circuit of these relays, which includes contacts 4 of each operated one of them and relay 211, to ground on conductor 237. The first transfer relay 211 is thereupon operated. The operated relays of register R1 remain operated in series therewith. Back contact 6 of relay 211 disconnects the grounded conductor G of R1 from conductor 238 (to permit mark relay 224 to restore under tape reader control) and front contact 6 of relay 211 transfers the grounded conductor G of R1 to the terminal of the second transfer relay 212 which corresponds to the terminal of relay 211 to which hold conductor 237 is connected, thereby preparing a holding circuit for relay 212 and for any relays of register R2 which are subsequently operated.

With transfer relay 211 operated, the digit signals over conductors 0 to 8 in group 151 which correspond to the succeeding digits of the number being read by the tape reader are received in succession on the succeeding registers R2 to R7, or on as many of those registers as are required, according to the number of digits contained in the number being read. For example, when the second digit is received in register R2, ground on the associated conductor G thereof temporarily passes through back contacts 6 of transfer relay 212 to again ground conductor 238 temporarily and thus operate mark relay 224 to cause the tape reader to advance to the next frame, whereupon transfer relay 212 operates in series with the actuated relays of register R2, to thus transfer the control to the third register R3, and so on as the digit signals are read by the tape reader and transferred to the code receiver.

*Receiving Six-Digit Switching Numbers*

As explained in the noted prior application, each connection to be established through the switching network requires a six-digit number, of which the first three digits index the input line IL associated with the primary switching stage, and the final three digits index the output line OL associated with the secondary switching stage. The six digits of any such connection establishing number are received in succession as described on the registers R1 to R6 respectively of the code receiver, transfer relays 211 to 216 operating in succession as described. Nothing is received on the final register R7 at this time, nor is its associated transfer relay 215 operated.

Since the number being received refers to a switching operation, the final digit frame thereof is succeeded by a start frame punched to cause only start conductor ST1 of group 151 to become grounded, thereby operating start relay 225 without the coincident operation of start relay 226. Front contact 1 of relay 225 grounds conductor 245 through contacts 2 of relays 226, thereby grounding conductor 6 of local group 229 through back contact 2 of relay 228. If the sixth transfer relay 216 is operated, as it normally is when the assumed six-digit number has been received in the code receiver, the ground on conductor 6 of local group 239 is extended through contacts 7 of relay 216, and conductor 1 of local group 240, to one terminal of test relay 230, associated with switch controller 300. If the switch controller 300 is idle, there is an idle indicating potential on sleeve conductor S thereof in group 201, operating test relay 230. Contacts 1 of relay 230 operate hold relay 232, and contacts 2 ground conductor 234 to operate relay CONN-1, the connect relay associated with the switch controller. Relay CONN-1 connects the sets of digit conductors D1 to D6 in group 201 to the sets of digit conductors 0 to 8 controlled respectively by registers R1 to R6, thereby transmitting signals to the switch controller corresponding to the operated ones of the relays in R1 to R6.

Contacts 5 of hold relay 232 reenergize the winding of timer relay 223, and recharge the holding condenser thereof, before the timer relay has had time to restore; contacts 1 and 3 of 232 shunt the corresponding contacts of clearout relay 233; contacts 2 perform a preparing operation; and contacts 4 operate clearout relay 233 from ground maintained on conductor 241 by contacts 8 of each operated one of the transfers relay 211 to 217. Contacts 1 and 2 of relay 233 execute preparing operations, and its contacts 3 lock relay 233 to ground on conductor 241 independent of the contacts of relay 232.

As is explained hereinafter, switch controller 300 executes a starting operation upon receiving the signals transmitted thereto over conductor 202 as described, incidental to which the switch controller removes idle-indicating potential from conductor S in group 201, marking the switch controller busy to the code receiver. When this occurs, test relay 230 in the code receiver is open-circuited and accordingly restores. Relay CONN-1 responsively restores, terminating signal transmission over conductors 202.

Hold relay 232 is restored by relay 230, leaving clearout relay 233 locked to ground on conductor 241. Holding conductors 237 and 246 thereupon become ungrounded, and mark-control conductor 238 becomes grounded through front contact 1 of relay 233 and contacts 2 of relay 232, operating mark relay 224, to cause the tape reader to advance to the next frame as described. The ungrounding of conductor 237 open-circuits and restores transfer relay 211, along with the operated relays of register R1. Transfer relays 211 to 216 thereupon responsively restore in succession, accompanied by the restoration of the operated relays in registers R2 to R6. The restoration of the last one of the transfer relays ungrounds conductor 241, restoring the locked clearout relay 233. Front contact 1 of relay 233 removes ground from conductor 238, thereby permitting mark relay 224 to restore as soon as the tape reader has advanced to unground lock conductor LK, whereupon contacts 2 of relay 224 ground conductor MK in group 151 to cause the first group of digit signals of the next number to be transmitted by the tape reader, thereby beginning the setting of the code receiver for the next number.

When the next number has been stored in the code receiver and one of the start relays 225 and 226 is operated, the stored number is transferred to the one of the controllers of FIGS. 3 and 4 which corresponds to the operated relay start 225 or 226, subject to there being an idle indicating potential on the sleeve conductor S of the selected controller to permit the corresponding one of the test relays 230 and 231 to operate thereover. If the selected controller is in use, as when it has not finished its cycle of operations in which engaged in response to a previous transmission of a number thereto, code receiver 200 stands idle with the number fully registered therein until the controller becomes idle.

*Receiving Seven-Digit Adjustment Numbers*

Certain adjustments (adjustment of a potentiometer P of FIGS. 1 and 7 to 9) require the transmission of a seven-digit number to the adjustment controller 400 of FIGS. 1 and 4. The digits of such a number comprise three digits to select the device to be adjusted, three digits to select a potentiometer adjustment, and one digit to effect an adjustment of the associated input resistance, if the potentiometer be provided with one.

When a seven-digit number is received by the code receiver from the tape reader, the digits thereof are recorded respectively on the registers R1 to R7 of the code receiver by operations as described, including the described operation of relays 211 to 217 in succession, just after the receipt of digit information by the respective associated registers.

Following the receipt of the seventh digit of the number a start signal is received over conductor ST2 of group 151 to operate the second start relay 226. Contacts 1 thereof ground conductor 244 through contacts 1 of the unoperated start relay 225 (as contrasted with the described operation of start relay 225 which grounds conductor 245), thereby extending ground through back contact 1 of relay 228 to conductor 7 of group 239. If the seventh transfer relay 217 is operated, ground potential is further extended over conductor 2 of group 247, to one terminal of the second test relay 231. If the adjustment controller 400 of FIGS. 1 and 4, is idle, test relay 231 is operated from idle-indicating potential on conductor S in group 202, leading to the adjustment controller 400.

Contacts 1 of test relay 231 operate hold relay 232 with results as described, while contacts 2 ground conductor 235 operating relay CONN–2 to connect the output digit-signal conductors 0 to 8 of registers R1 to R7 to the corresponding conductors in digit groups D–1 to D–7 in conductor group 202, leading to the adjustment controller. The 7-digit number is thereby transferred to the adjustment controller.

A starting operation herinafter explained now occurs in adjustment controller 400 to remove the idle-indicating potential from sleeve conductor S in group 202, whereupon test relay 231 restores to cause the code receiver 200 to clear out and cause the tape reader to advance as described.

*Receiving Short Numbers*

Code receiver 200 may receive a short number intended for either of the controllers. A short number intended for switch controller 300 comprises three digits indexing an input line included in a connection which is to be released (and usually to be replaced forthwith by another connection), while a short number intended for adjustment controller 400 comprises a four-digit number indicating selection and adjustment of either of the devices AA and AIR of FIGS. 1, 5, 6 and 9.

When a short number, three digits or four digits, is placed on the tape, one of the tape frames consists of, or includes, a signal for transmission over the short number conductor SN of group 151. Such a signal closes a circuit, through contacts 3 of relay 222, for the short-number relay 227, which thereupon operates for the duration of the signal. It operates the short-number storing relay 228 from ground on conductor 246. Contacts 4 of relay 228 ground conductor 3 in local group 242 as a preparing operation; contacts 2 lock relay 228 to ground on conductor 246; and contacts 1 and 2 transfer conductors 244 and 245 from conductors 7 and 6 in group 239 to conductors 4 and 3 respectively. Consequently, when one or the other of the conductors 244 and 245 becomes grounded by its associated start relay 225 or 226, one or the other of conductors 4 and 3 in group 239 becomes grounded to operate the appropriate one of the test relays 230 and 231 as described, for contacts 7 of the third transfer relay 213.

When either test relay 230 or 231 operates, the resulting operation of the corresponding connecting relay CONN-1, or CONN-2 extends the grounded short-number conductor 3 in local group 242 (grounded at contacts of short-number relay 228) to the short-number conductor SN in the concerned one of groups 201 and 202, thereby transmitting a short-number signal to the seized one of the controllers along with the transferred digit information.

When the three-digit or four-digit short-number has been transferred to the corresponding controller, the described clearing out operation occurs responsive to the removal by the last-named controller of idle-indicating potential from its conductor S (group 201 or 202) to restore the operated test relay 230 or 231. The locked short-number relay 228 restores responsive to the described removal of ground potential from conductor 246.

When the last number of the program has been transmitted, the code receiver 200 comes to rest with only relay 222 operated, and so remains for the lack of any further information from the tape reader. That condition is signalled to the attendant by a steady ground signal through back contacts 4 of relays 226 and 225, and contacts of 223. The attendant at the manual controller, may upon checking the tape reader to insure that the tape has completely run, may remove ground from TR of 161 to restore relay 222 thereby reoperating timer relay 233 to remove the steady disconnect signal from conductor AL.

In the described operation of the code receiver, timer relay TM is normally maintained operated continuously by the recurring operations of hold relay 232, contacts 5 of which reenergize relay 223 and recharge its illustrated holding condensers each time one of the test relays 230 and 231 operates to cause a stored number to be transferred. But, if reoperation of hold relay 232 is unduly delayed, timer relay 223 restores and sends an alarm signal over conductor AL of 161 to the manual controller.

If the delay occurs with neither of the start relays 225 and 226 operated, a steady alarm signal is sent through back contacts 4 of 225 and 226, indicating a failure of the code receiver to receive a complete set of number signals from the tape reader. The attendant at the manual controller may cause relay OBS of the code receiver to operate to give an indication at the manual controller, over conductors in group 161, of the setting of the relays in the register R1 to R7 of the code receiver.

If the noted delay of relay 232 to reoperate occurs with either of the start relays 225 and 226 operated, a flashing signal is given, through front contact 4 of 225 or 226, indicating a failure of the pertaining controller 300 or 400 to accept a completely recorded number, as evidenced by failure of one of the test relays 230 and 231 to operate relay 232. A selected test relay may fail to operate because (1) contacts 7 of the pertaining transfer relay 213, 214, 216 or 217 may have failed to close, or because (2) idle-indicating potential may not be present on the selected one of the conductors S of groups 201 and 202.

If desired, as when the fault is not readily correctable at the moment and is one not likely to recur on succeeding receiver operations, the operator may clear out receiver 200, to thus temporarily omit the number therein and schedule it for transmission later from the manual controller or from an auxiliary tape applied to the tape reader. For this clearout purpose tape-reader relay 222 may be temporarily restored in favor of manual-controller 221, permitting error relay 229 to be operated from the manual controller responsive to the conjoint operation therefrom of start relays 225 and 226.

FIG. 3—SWITCH CONTROLLER 300

Referring now particularly to FIG. 3, switch controller 300 of FIGS. 1 and 3 is shown only in part. To the extent not shown this switch controller may be as disclosed in the noted prior application. As hereinbefore described switch controller 300 is supplied with digit information from the code receiver of FIG. 2 over the six five-conductor digit groups D1 to D6 in group 201, which digit groups extend to the registers R1 to R6, each of which is assumed to be as disclosed in the noted prior application.

The illustrated start and start-auxiliary relays 351 and 352 and clearout and release relays 355 and 357, are normally restored. The switch controller normally maintains an idle-indicating potential on sleeve conductor S in group 201 from the ungrounded negative pole of the supply source, through resistor 351 and contacts 9 of relay 352.

When the switch controller is seized by the code receiver as described, it normally receives a six-digit number to set all of its registers R1 to R6, in which case starting ground is extended through terminals 1 and 2 of all six registers R1 to R6 in series, to actuate start relay 351. Contacts 6 of relay 351 lock the relay to ground through contacts 9 of relay 355, while contacts 3 operate start start-auxiliary relay 352. The latter relay opens its contacts 9 to remove the idle indicating potential from the associated conductor S in group 201, thereby marking switch controller 300 busy to the code receiver.

Other contacts of relays 351 and 352 (not shown herein) make appropriate connections to cause the switch controller to exercise its control operations over conductors in groups 301 to 303, following which a clearing-out operation occurs which includes the operation of clearout relay 355. Contacts 7 and 9 of relay 355 open to permit relays 351 and 352 to restore, whereupon contacts 9 of relay 352 replace idle-indicating potential on conductor S of group 201 to mark the switch controller idle to the code receiver.

When a previously noted short number is received, consisting of three digits identifying a connection to be released, only the first three registers R1 to R3 of controller 300 receive digit information. As an indication that the number being received is a three-digit release number, short-number conductor SN in group 201 is grounded by the code receiver as described, operating release relay 357. At its contacts 9, relay 357 locks itself operated through contacts 5A of clearout relay 355, while its contacts 10 close a start circuit for relay 351 which include contacts 1 and 2 of only the first three registers. As disclosed in the noted prior application, other contacts of release relay 357 cause a suitable control to be exercised over conductors in group 301 to release the connection extending from the input line indexed by the three digit number stored in R1 to R3.

When the control operations of the switch controller have been concluded, clearout relay 355 is operated to clear out the switch controller as described. The opening of contacts 5A of relay 355 permits release relay 357 to restore.

FIG. 4—ADJUSTMENT CONTROLLER 400

Figure 13:
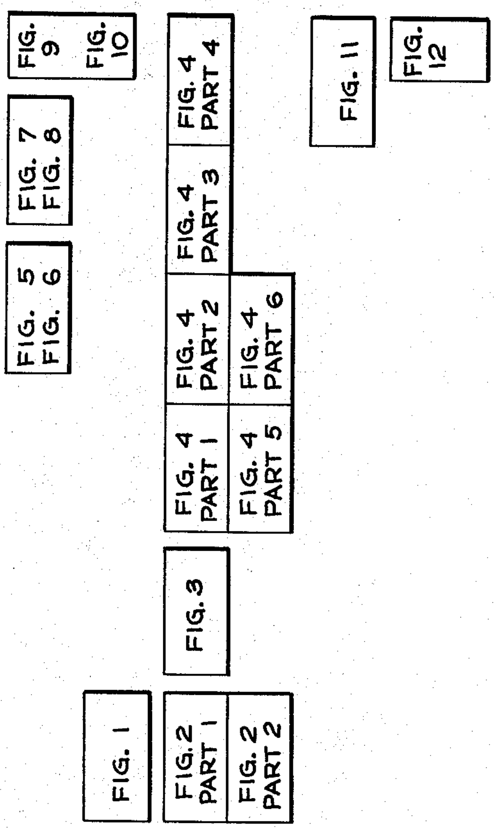
FIG. 13 shows the preferred arrangement of the sheets of drawings for ready understanding thereof.

Adjustment controller 400 of FIGS. 1 and 4 will be described with reference to FIG. 4, comprising parts 1 to 6, which should be arranged as shown in FIG. 13 to be understood best.

As described, adjustment controller 400 receives its control information over the conductors in group 202, from the code receiver 200 of FIGS. 1 and 2. It includes seven similar registers R1 to R7 (FIG. 4, part 1).

As shown for R1, each of these registers includes five relays 0, 1, 2, 4, 8, for receiving coded digit information over the corresponding one of the associated conductors 0 to 8 in incoming group 202. Each register R1 to R7 has checking terminals 1 and 2, and has a terminal 3 to which ground may be applied over its associated ground conductor G to appear on the one of the ten associated digit output conductors 0, 1, 2, etc., to 9, depending upon the particular combination of two of the five relays of the register which is currently operated, in accordance with the code table hereinbefore given. That is, any register receives digit information according to a two-out-of-five code and supplies the corresponding decimal equivalent over the appropriate one of the ten associated digit wires. Each register further terminates a separate locking conductor L, which is employed to lock any one of its relays in operated condition until the intended use has been made of the digit information stored therein.

As shown in parts 2 and 3 of FIG. 4, the adjustment controller includes seven decimal digit registers, DR1 to DR7, controlled respectively from the code registers R1 to R7 over respective ten-conductor digit groups D1 to D7 in conductor group 452. Each register DR1 to DR7 comprises ten relays designated 0, 1, etc., to 9, of which relays 2, 3, 7, and 8 are omitted at DR1, with the relays 2 to 8 being omitted at each of the registers DR2 to DR7, for economy of space.

As hereinafter described, contacts of registers DR1 to DR3 are interconnected to effect selection of any one of 500 potentiometer gate conductors 000 to 499 in cable 400A, a selection of any one of 100 amplifier gate conductors 500 to 599 in group 400B and a selection of any one of 100 input-resistor gate conductors in the group 400C.

The fourth register DR4 is used for four-digit numbers, to control the adjustment to be made at any adjustable amplifier or adjustable input resistor selected according to the setting of DR1 to DR3.

When a seven digit number is received, indicating a potentiometer adjustment, registers DR4, DR5 and DR6, indicate a desired one of 1000 settings for the potentiometer. The final digit register DR7 is then used to indicate a setting to be given to the adjustable input resistance associated with the potentiometer.

Registers DR4 to DR6, considered with the ten similar detector fields DF0 and DF1 to DF9 (FIG. 4, part 4) comprise a 1000-number translator which is a modification of a 1000-number translator known in the telephone switching industry. Detector fields DF2 to DF8 are omitted from the drawing to conserve space.

The circuit arrangement of detector field DF0 only is shown in detail. It comprises one hundred verticals labeled respectively V00, V01, etc., to V99, verticals V03 to V98 being omitted to conserve drawing space. The verticals extend in crossing relationship with, but not directly in contact with, ten horizontal conductors H1 to H10, horizontals H3 to H9 being omitted to conserve drawing space. One hundred input conductors 00, 01, etc., to 99, in group 465 are multiplied to all detector fields DF0 to DF9. At DF0 they extend respectively to the verticals V00 to V99 by way of individual input rectifiers IR, which provide reverse-current isolation of the input conductors 00 to 99 from the verticals V00 to V99 keeping in mind that the noted multipling of input conductors to all of the detector fields, whereby a foreign connection to a vertical in one detector field does not adversely affect the corresponding verticals in the other detector fields.

The horizontals H1 to H10 of the several detector fields are connected by associated groups of outlet conductors 0X to 9X (group 464), to the relays of register DR4, which effect a selection among the detector fields.

Translating rectifiers TR are installed at desired cross points within detector field DF0, whereby any vertical is connected to any desired combination of the associated horizontals through respective rectifiers TR which maintain reverse current isolation of the verticals and the connected horizontals.

The illustrated network of resistors in DF0 is provided to maintain a relatively mild reverse biasing potential (16 volts for example) on the rectifiers TR. This network comprises the potential divider resistors, VD1 and VD2, from the junction of which individual high-resistance branch resistors VBR extend to the respective verticals. Individual high-resistance branch resistors HBR are connected between the respective horizontals and ground.

Adjustment controller 400 further includes fourteen general control relays 401 to 414. Of these: 401 and 402 are start and short number relays; 403 and 404 are clearout relays; 405 and 406 are the slow-restoring timer relay and the first checking relay; relay 407 corresponds to the five hundred-digit values 0 to 4 of digit register DR1; relays 408 and 409 correspond respectively to hundreds-digit values 5 and 6 of DR1; relay 410 is the vacant-number relay operable when the number received by the adjustment controller is vacant; 411 and 412 are the second checking relay and the operate relay which initiates transmissions of selected adjustment signals; and 414 and 413 are a transfer relay and the third checking relay.

The adjustment controller further includes relays employed to transmit adjustment signals to the adjustable components and to receive comparing signals therefrom after the adjustment has been effected. These comprise ten translation detecting relays TD1 to TD10, which detect the decimal-to-binary translation effected through any one of the detector fields DF0 to DF9; potentiometer-adjustment relays P1 to P10, controlled respectively by TD1 to TD10; resistor-setting relays P11 to P13, controlled from register DR7 according to the adjustment to be placed on an input resistor which may be associated with a selected potentiometer; potentiometer-checking relays CP1 to CP12 which are employed to check the affected potentiometer and associated input-resistor adjustments; amplifier relays A1 and A2, controlled according to the setting of register DR4 to indicate the adjustment to be placed on a selected adjustable amplifier, together with checking relay CA1 to check the resulting effected adjustment of the amplifier; and resistor relays R1 to R3, controlled by register DR4 to indicate a desired adjustment of an adjustable input resistor, together with checking relays CR1 and CR2 for checking the resulting effected adjustment.

*Control of Potentiometer Adjustment*

When any one of the potentiometers P000–P499 is to be adjusted to a new setting or when any of the input resistors associated with these potentiometers are to be adjusted to a new setting, the code receiver of FIGS. 1 and 2 transmits signals over the conductors in group 202 indicative of the potentiometer and the desired setting of the potentiometer and of the associated input resistor. These digit signals are received over appropriate ones of the conductors 0 to 8 in each of the digit groups D1 to D7 which comprise the input conductors to the registers R1 to R7. Two of the five relays 0 to 8 in each of the registers are thereby operated. Contacts 7 of the operated register relays prepare to lock the relays to ground over locking conductors L1 to L7, associated respectively with the registers.

As shown for the relays of register R1, each register is provided with a checking path between terminals 1 and 2 thereof which is closed if, and only if, precisely two of the five relays of the register are operated as shown in R1, this path includes contacts 5 of relays 0 and 8; 4 and 5 of relay 1; 3, 4, and 5 of relay 2; and 2 to 5 of relay 4. If, for example, relays 0 and 8 of this register are operated, the checking chain is complete through front contacts 5 of relays 0 and 8, and back contacts 5, 4, and 2 of relays 1, 2, and 4. The concurrent operation of one or more of the additional relays results in the opening of the checking path and a failure to close a new one.

If precisely two relays are operated in each register R1 to R7, a checking circuit is complete through terminals 1 and 2 of all 7 registers in series, thereby grounding start conductor 454 to operate start relay 401. At contacts 4, relay 401 locks to conductor 455, grounded at contact 6 of any operated relay of any register R1 to R7; contacts 3 of 401 disconnect idle-indicating potential (through resister 451) from conductor 456, being the sleeve conductor S in group 202, thereby marking the adjustment controller as busy and indicating to the code receiver that the transferred number has been received, wherefore the described clearing out of the code receiver may commence; contacts 2 of 401 apply locking ground to conductors L1 to L7 to lock operated the operated pair of relays in each of the registers R1 to R7; contacts 5 open-circuit slow-restoring timer relay 405 to permit that relay to restore if the adjustment controller has not completed its operations and cleared out within an interval of a second or so according to the preset holding capacity of the condenser associated with relay 405; and contacts 1 of relay 401 ground conductors G1 to G7 through contacts 1 to 7 of clearout relay 403, thereby grounding terminal 3 of each of the registers R1 to R7. As shown for register R1, the terminal 3 thereof is connected to the apex of a contact pyramid which includes contacts 2 of relay 2; 2 and 3 of relay 1; and 2 to 4 of relays 8 and 0. Ten decimal-equivalent conductors, 0 to 9, extend from the base of this contact pyramid at each register, thus providing seven ten-conductor digit groups D1 to D7 in conductor group 452, leading to the ten relays of the respective digit registers DR1 to DR7. The digits received in code at R1 to R7 are thus translated and transmitted decimally to the registers DR1 to DR7, wherein a single one of the ten relays of any register operates, the one operated depending upon the decimal equivalent of the digit stored in code on the corresponding register R1 to R7.

For monitoring purposes, the lowermost contacts of each of the registers DR1 to DR7 applies ground to the coded combination of two of the five associated monitoring conductors, 0 to 8, which corresponds to the operated relay of the register, and the five monitoring conductors of the several registers DR1 to DR7 are extended over branch groups TD1 to TD7 of conductor group 400D leading to fault indicator 180, through which a monitoring indication can be received, when desired, at manual controller 160 of the digit settings at the respective registers DR1 to DR7.

For checking purposes, in order to insure that at least one relay, and no more than one relay, is operated in each of the registers DR1 to DR7 required for a received number (all seven or only the first four operated), each register is provided with a checking chain of contacts comprising two sets shown immediately underneath the relay windings. They are contacts 3 and 4 at DR1; 8 and 9 at DR2; 71 and 72 at DR3; 12 and 13 at DR4; 2 and 3 at DR5 and DR7; and 11 and 12 at DR6. Referring to register DR1 for example, when no relay is operated therein, the checking chain is open at the unclosed front contacts 4, but if a single relay of the register is operated its front contacts 4 complete the checking chain. For example, when relay 0 of DR1 is operated alone, front contact 4 thereof completes the checking chain of DR1 through back contacts 3 of the remaining relays; if relay 9 is operated alone front contact 4 thereof completes the checking chain through back contacts 4 of the preceding relays; but, if two or more of the relays of DR1 be operated, the chain which one relay tends to close at its front contact 4 is opened at contacts 3 of each other operated register relay.

In the assumed example, where all seven registers are set, if all of them are set correctly, one relay only energized in each, ground through the seven register chains in series reaches checking conductor C7 in group 458, thereby operating the first checking relay 406 as an indication that all of the registers DR1 to DR7 are correctly set. Contacts 1 of relay 406 extend ground through contacts 2 of vacant-number relay 410 to conductor G1 in group 458, which is the apex point of the contact tree carried by the relays of registers DR1 to DR3 for selecting the gate conductor 000 to 699 (included in conductor groups 400A to 400C) required to effect gating selection of the adjustable component to which the first three digits of the received number correspond.

The energized one of the first seven relays 0 to 6 of DR1 connects the associated conductor G1 to the corresponding one of the conductors 0 to 6 of group 461. Any such conductor is further extended, through one or another of its ten branches, by the operated one of the ten relays 0 to 9 in digit register DR2, being one of the conductors in group 0X to 6X of group 462. The selected one of the seventy conductors 462 is further extended, through one of its ten branches, by the operated one of the ten relays in DR3, to one of the gating conductors 000 to 699 in group 463, composed of seventy ten-conductor sub-groups 00X to 69X. The first five hundred of these conductors (sub-groups 00X to 49X) are carried in conductor group 400A associated with the respective potentiometers P to which the gating conductors respectively extend. The next one hundred gating conductors (sub-groups 50X to 59X) appear in group 400B, extend respectively to the adjustable amplifiers AA. The final one hundred gating conductors 463 (sub-groups 60X to 69X) are shown as carried in group 400C and extend respectively to the 100 input resistors.

In the assumed example, since a seven digit number is received, the adjustment to be effected is at one of the potentiometers P, in which case one or another of the first five relays 0 to 4 of digit register DR1 is energized. If the potentiometer designated P000 (shown in circuit diagram in FIG. 7) is selected, gating conductor 000 in group 400A is energized to operate gating relay 710 with results as hereinafter explained.

Contacts 2 of the operated relay of register DR1 energizes the associated one of the ten conductors 10 to 19 in group 458 which terminate as shown in association with checking relay 406. If the digit registered on DR1 has any value from 0 to 4, as it is expected to have whenever the received number contains 7 digits as currently assumed, ground on any one of the conductors 10 to 14 in group 458 operates the 0 to 4 relay 407. Contacts 1 to 3 of relay 407 disconnect conductors 71 to 73 of group 458 (controlled respectively by relays 1 to 3 of the 7th digit register DR7) from vacant-number conductor 473 and extend them respectively to conductors 71 to 73 in group 468 in preparation for the operation of the associated one of the input-resistor relays P11 to P13; and contacts 4 and 5 of 407 ground conductors G3 and G4 of group 458. The grounding of conductor G4 closes a circuit through contacts 1 of the operated one of the relays in DR7, thereby grounding one of the conductors 70 to 79 in group 458. Normally, the 7th digit has a value of from 1 to 3, causing one of the conductors 71 to 73 in group 458 to become grounded, thereby extending ground to the corresponding one of the conductors 71 to 73 in group 468 by way of contacts of the operated relay 407, as a consequence of which the corresponding one of relays P11 to P13 operates to indicate the desired setting to be applied to the input resistor associataed with the selected potentiometer.

The noted grounding of conductor G3 in group 458 results in the extension of ground, through contacts 1 of the operated one of the relays in DR5, and thence over one of the conductors 0 to 9 in group 465. The ground on any such conductor is further extended to any one of the ten branches thereof controlled by contacts of the relays in register DR6. One of the one hundred conductors 00 to 99 in group 466 is thereby grounded, thus grounding the corresponding input conductor 00 to 99 of each of the detector fields DF0 to DF9. The one of verticals V00 to V99 in each detector field which corresponds thereto, is thereby grounded through its associated input rectifier IR. The ground on any such vertical is normally further extended, through one or more translating cross-point rectifiers TR to one or more of the associated horizontals H1 to H10 of each detector field, and is thus forwarded through one or more of the conductors 1 to 10 of each of the sub-groups 0X to 9X of group 464. Thus, ten translations of the fifth and sixth digits of the seven-digit number are effected, one at each of the detector fields DF0 to DF9, but only one such translation is permitted to take effect, being the one which corresponds to the operated one of the ten relays of the fourth register DR4. Thereat, the ten conductors in the associated sub-groups 0X to 9X of group 464 are connected respectively to translation-detecting relays TD1 to TD10 (part 6) within the adjustment controller. The combination of these relays which corresponds to the cross-point placement of rectifiers TR in the effective one of the detector fields DF0 to DF9 now operates. Each operated one of the relays TD1 to TD10 operates the corresponding one of the respectively associated potentiometer relays P1 to P10, in preparation for the transmission of corresponding adjustment information to the selected potentiometer.

With any one of the relays P11 to P13 operated, associated with input-resistor adjustment at the selected potentiometer, and with at least one of the relays P1 to P10 operated, which relate to the binary-code adjustment of the selected potentiometer, ground is extended serially through contacts 1 of one of the relays P11 to P13 and contacts 1 of one or more of the relays P1 to P10 to operate the second checking relay 411. Contacts 1 to 3 of 411 extend ground through the corresponding back contacts of relay 412 to release conductors RL, being the respective release conductors RL in groups 400A, 400B, and 400C. At potentiometer P000 of FIG. 7 with gating relay 710 operated as described ground on release conductor RL of group 400A operates release relay 723 of the device to bring the adjustment at P000 to normal in preparation for the receipt of the new adjustment.

Contacts 4 of checking relay 411 close a circuit for the operate relay 412, the operation of which is delayed for a sufficient, but slight, interval to permit the noted clearing out of the previous adjustment of the selected component to occur. Upon operating, relay 412 disconnects ground from each of the conductors RL1 to RL3 (conductors RL in 400A to 400C) and transfers ground to each of the operate conductors OP1 to OP3 which are associated respectively with the cables 400A to 400C through contacts of the intervening relays. The grounding at this time of operate conductors OP2 and OP3 is of no effect because no gating relay has been energized over either of the cables 400B and 400C. The grounding of operate conductor OP1, however closes an effective circuit through contacts 3 of any operated one of the relays P1 to P10 and contacts 3 of one or another of the relays P11 and P12 (if either of these relays is in fact operated) and thence through back contacts of transfer relay 414 to the concerned ones of the conductors 1 to 10, 71 and 72, in conductor group 400A, and thence to the selected component by way of contacts of its selected and operated gate relay, such as 710, to operate the adjustment relays thereof, such as 711 to 722 of P000. Release relay 723 of P000 restores as a result of the described removal of ground from conductor RL of 400A, whereby each newly operated relay 711 to 722 locks itself to ground through contacts of the restored release relay 723. The desired adjustment is thereby retained by the component after the adjustment controller has cleared out.

Contacts 4 of operate relay 412 close an operating circuit for relay 414, the operation of which is designed to be slightly hesitant (partly because of its relatively heavy contact load) to give a slight, but sufficient, time for the selected component to be adjusted as described. At its contacts 1 to 15, relay 414 disconnects conductors 1 to 10, 71, and 72 of group 400A, conductor 47 of group 400B, and conductors 41 and 42 of 400C from contacts 3 of relays P1 to P12, A1, R1, and R2, and transfers these conductors to the windings of the checking relays respectively associated with the relays last named and comprising checking relays CP2 to CP12, CA1, CR1, and CR2. Each one of the last-named relays operates subject to the conductor transferred thereto having ground thereon, and any such conductor is expected to have ground thereon if the corresponding one of the relays P1 to P12, A1, R1, R2 stands operated. The ground on any such transferred conductor is the ground which is returned thereon as a result of the relay to which it has been extended through contacts of a gating relay having locked to ground as described for the apparatus of FIG. 7.

Contacts 16 at relay 414 operates the third checking relay 413 at the end of a sufficient, but slight interval which permits the checking relays which are energized to become fully operated. Contacts 1 of relay 413 ground conductor 469, which is the starting point of a checking chain through contacts of the actuation-control relays beginning with P1 and contacts of the checking relays beginning with CP1. The purpose of this checking chain is to ground clearout conductor CL only if the checking relays which are operated respectively match the actuation-control relays which are operated, and to ground mismatch conductor MM otherwise. For example, if (with relay 413 now operated) relay P1 does not stand operated, but checking relay CP1 stands operated over conductor 1 in group 400A, as a result of false ground on the latter conductor, the checking ground on conductor 469 is extended through back contact 2 of P1, and through front contact 1 of CP1 to mismatch conductor MM, and is prevented from reaching clearout conductor CL by the open condition of back contact 1 of CP1. To the same effect, if relay P1 stands operated and if CP1 is not operated (as when the corresponding adjustment relay of the selected component has failed either to operate or to lock operated), ground on input checking conductor 469 passes through front contact 2 of relay P1, and is extended thence through back contact 2 of relay CP1 to mismatch conductor MM, and is prevented from reaching clear-out conductor CL by the open condition of front contact 2 of CP1.

If neither relay P1 nor CP1 is operated, the ground on conductor 469 passes through back contact 2 of P1 and back contact 1 of CP1 to reach the lever contact of relay P2, for checking by relays P2 and CP2, and so on, through the chain.

If both of the relays P1 and CP1 are operated, the input conductor 469 is extended through front contacts 2 of P1 and CP1 to the input point at relay P2 for further extension throught the contacts of the following pairs of relays in the checking chain.

Thus, a mismatch at any checking pair of relays causes mismatch conductor MM to be grounded, while a match at any checking pair extends the checking chain through the contacts of the checking pair toward clearout conductor CL.

Assuming that the contacts of the checking relays indicate a match, conductor MM is not grounded but the ground through input conductor 469 is extended through the matching chain to conductor CL, thereby operating clearout relay 403. Contacts 1 to 7 of 403 unground conductors G1 to G8 in group G, thereby ungrounding the apex of the contact pyramid (terminal 3) at each of the registers R1 to R7, which open circuits and restores the operated relay in each of the registers DR1 to DR7. The selected gate relay, such as 710 is thereby restored to disassociate the common conductors (such as those in group 400A) from the previously selected component. Also all operated ones of relays 406 to 414 now restore, along with all operated ones of the relays TD1 to TD10, relays P1 to R3, and relays CP1 to CR2.

Contacts 8 of 403 operate the second clearout relay 404, which ungrounds locking conductors L, thereby permitting the locked relays of registers R1 to R7 to restore. When they have all restored, ground is removed from conductor 455, as well as from conductors 453 and 454, whereupon start relay 401 restores and reapplies idle-indicating potential through resistor 451 to conductor 456, being the sleeve conductor S of the adjustment controller in group 202. The code receiver is thereby permitted to transmit a further adjustment number to the adjustment controller.

Timer relay 405 is reenergized, first at contacts 9 of 403, and later at contacts 5 of 401, to recharge its associated storing condenser, which operation normally occurs before relay 405 has restored responsive to the described operation of start relay 401 at the beginning of the operations of the adjustment controller.

*Control of Amplifier and Input-Resistor Adjustments*

When adjustment is required at any one of the one hundred adjustable amplifiers AA or at any one of the one hundred adjustable input resistors AIR, the adjustment controller receives a four-digit number from the code receiver, on the first four registers R1 to R4, there being no setting required for registers R5 to R7. At the same time, the adjustment controller receives a short-number signal comprising ground applied to conductor SN of group 202 by the code receiver, as described. Short-number relay SN is responsively operated over conductor 457. At its contacts 1, relay 402 locks itself to ground through contacts 8 of relay 404 to store the short-number indication; contacts 2 of 402 prepare a modified circuit for start relay 402; and contacts 3 prepare a modified circuit for checking relay 406.

If exactly two relays are operated in each of the registers R1 to R4, as is normal, checking ground is extended through terminals 1 and 2 of these registers in series to conductor 453, closing an operate circuit for start relay 401 through contacts 2 of 402. Relay 401 operates as described to lock the operated relays of the registers and to ground their input points 3 through contacts of relays 404 and 403. The relays in digit registers DR1 to DR4 which correspond to the digit settings respectively of registers R1 to R4 now operate. If precisely one relay is operated in each of the registers DR1 to DR4, checking ground is transmitted serially through contacts thereof, as described, to checking conductor C4 in group 458 which is connected to the checking chain between DR4 and DR5. Ground on this conductor operates checking relay 406 through contacts 3 of 402 with results as described, comprising the selection of a gating conductor according to the combined setting of registers DR1 to DR3. In a correct and logical four-digit number, one of the gating conductors 500 to 599 in cable 400B, or one of the gating conductors 600 to 699 in cable 400C, is grounded, depending upon whether adjustable amplifier or an adjustable input resistor is to receive an adjustment. The gating selection is made between conductor groups 400B and 400C according to whether the first digit has a value of 5 or a value of 6.

If an amplifier adjustment (as at AA500, FIG. 5) is to be effected, the digit recorded on DR1 has a value of 5. Relay 5 of that register is then operated to ground the associated conductor 15 in group 458, thereby operating relay 408 over conductor 5 in group 467. Contacts 1 and 2 of 408 disconnect conductors 49 and 47 (corresponding to relays 9 and 7 in the fourth digit register DR4) from vacant number conductor 478 and transfers them respectively to conductors 49 and 47 in group 468, preparatory to the operation of one of the other relays of A1 and A2 associated with amplifier adjustment. Contacts 3 of relay 408 ground conductor G2 in group 458 thereby rendering effective contacts 11 of the relays of register DR4 to energize the selected one of conductors 40 to 49. The selected one of the two relays A1 and A2 is thereby operated through contacts of relay 408.

Upon the operation of either relay A1 or A2, contacts 1 thereof close an operating circuit for the second checking relay 411, whereupon relays 411, 412, 414 and 413 operate in succession as described.

Figures 5, 6:
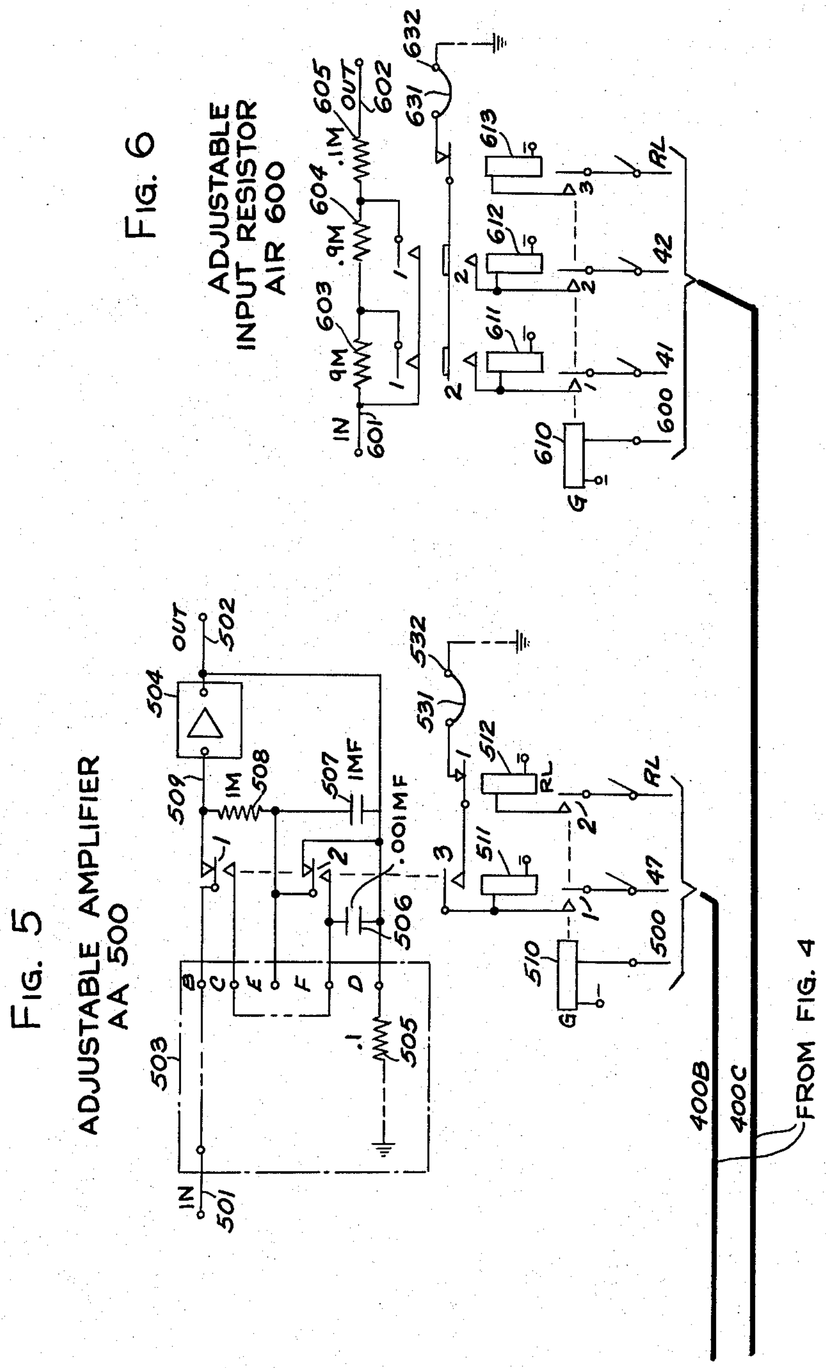
FIGS. 5 and 6 are circuit diagrams of adjustable amplifier AA500 and adjustable input resistor AIR600 of FIG. 1.

For example, if the adjustable amplifier selected for adjustment is the one shown in FIGURE 5, the relays operated in the first three registers DR1 to DR3 are 5, 0, and 0, causing gating relay 510 to have been selected and operated according to the joint setting of these registers, thereby connecting the common conductors 47 and RL in group 500 to relays 511 and 512. Then, when conductor RL in group 400B is grounded by the described operation of relay 411, release relay 512 operates and opens a point in the locking circuit of relay 511, restoring that relay, if operated. If the value of the fourth digit is 9, no-reset relay A2 is operated over the associated conductor 49 from conductor 49 of group 458 and through contacts 1 of relay 408, as an indication that a zero or normal adjustment is to be placed on the selected amplifier. On the other hand, if the value of the fourth digit is 7, reset relay A1 is similarly operated over the associated conductor 47 to prepare at its contacts 3, for the extension of an operating ground over conductor 47 in group 400B. This prepared circuit is closed on the described operation of relay 412, thereby operating relay 511 which prepares at its contacts 3 to lock itself operated through contacts 1 of relay 512. This locking circuit becomes closed when relay 512 is restored by the removal of ground from the associated conductor RL at back contact 2 of relay 412. The locking ground for relay 511 is thereby reflected on the associated conductor 47, through contacts 1 of gate relay 510 in preparation for the checking operation, which occurs on the described operation of relay 414. At that time conductor 47 in group 400B is transferred from the contacts of relay A1 and to the winding of relays CA1. If relays A1 and CA1 are both restored, the checking chain is complete through back contact 2 of A1 and back contact 1 of CA1 to clearout conductor CL. Similarly, if both of the relays are operated, the chain is complete to conductor CL through front contacts 2 of relays A1 and CA1. In either case, the consequent grounding of conductor CL causes the adjustment controller to clear out as described.

If an adjustable input resistor AIR is selected (by a setting 600 to 699 of DR1 to DR3), the results are similar except that digit-6 relay 409 is operated in place of digit-5 relay 408. Then 4th-digit conductors 41 to 43 in group 468 are rendered active to cause operation of one of the resistor-control relays R1 to R3, and the final checking is at contacts of relays R1, CR1 and R2, CR2.

*Interception of Vacant Numbers*

Previously noted circuit arrangements which include vacant-number relay 410 are provided to block adjustment-controller operation and to give a signal over vacant-number conductor VN in group 400D in the event that a vacant number is received, being a number in a block of numbers not assigned to adjustable components.

As noted, the first five of the 0 to 9 conductors 10 to 19 in group 468 represent first-digit values assigned to hundreds groups of potentiometers, wherefore 0 to 5 conductors 10 to 14 in the group are strapped together and extended to relay 407, as described. The next two higher values of the first digit are assigned to amplifier adjustment and input resistor adjustment, wherefore 5 and 6 conductors 15 and 16 in group 458 are extended respectively to relays 408 and 409 as described, but, the final three values 7 to 9 of the first digit are unassigned, wherefore conductors 17 to 19 in group 458 are strapped together and are extended over conductor 478 to the winding of vacant-number relay 410. Consequently, relay 410 is operated when the first digit has any unassigned value of from 7 to 9. Contacts 1 of relay 410 disconnect the second checking relay 411, whereby relays 411 to 414 are prevented from operating, thus halting the progress of the controller operation; contacts 2 of 410 unground conductor G1 of 458, being the ground source for energizing any selected gating conductor, wherefore no gating relay can now be operated; and contacts 3 ground vacant-number conductor VN in group 400D as a signal through indicator 180 of FIG. 1 that a vacant or illogical number has been received.

When timer relay 405 restores at the end of the period of a second or so for which it is designed and adjusted, because of the failure either of clearout relay 403 to operate or of start relay 401 to become restored during that interval, it grounds conductor TM in group 400D, thereby calling in fault indicator 180 to display an indication to the attendant at the manual controller, substantially as described in the noted prior application for the switch controller.

When a seven-digit number is received having a first-digit value of 0 to 4, relay 407 is operated as described thereby disconnecting (at back contacts 1 to 3) the seventh-digit conductors 71 to 73 of group 458 from vacant-number relay 410. Consequently relay 410 is not then operated to intercept the number if it has any 7th-digit value from 1 to 3. On the other hand, if the seventh digit has any other value, one of the 7th-digit conductors 70 and 74 to 79 is grounded, operating relay 410 over conductor 478 to effect vacant-number interception as described.

If a four-digit number is received as described having an assigned 1st-digit value of 5 or 6, one or the other of the relays 408 and 409 is operated as described to ground conductor G2 in group 458, as a consequence of which the one of conductors 40 to 49 which corresponds to the registered value of the fourth digit becomes grounded for checking and operational purposes. If relay 408 is the one operated, the only assigned 1st-digit values then are 5 and 6, corresponding to conductors 15 and 16 in group 458. It disconnects conductors 47 and 49 from the vacant-number conductor 478, leaving all other ones of the conductors 40 to 49 connected thereto, to thereby operate vacant-number relay 410 with described results if the fourth digit then has any value other than 7 or 9.

If relay 409 is the one operated, it disconnects conductors 41 to 43 from the vacant-number conductor 478, leaving all others of 40 to 49 connected, to thereby operate vacant-number relay 410 if the fourth digit then has any value other than 1 to 3.

*Supervisory and Progress Indications*

When the fault indicator 180 of FIGURE 1 is called in either by the grounding of conductor TM in group 400D by timer relay 405, or from manual controller 160 as described in the noted prior application, an indication of the setting of registers R1 to R7 is afforded over conductors 0 to 8 in incoming-digit groups ID1 to ID7 within group 400D; and an indication of the setting of each of the registers DR1 to DR7 is afforded over conductors 0 to 8 in translated-digit groups TD1 to TD7 within group 400D.

When fault indicator 180 is called in responsive to ground on conductor TM in group 400D, an indication is given over one of the conductors CK1, CK2, OP, TR, CK3, and CF of the progress made by the adjustment controller in completing its halted cycle of operations. These conductors are supplied in common with progress indicating ground through contacts 6 of start relay 401.

When check relay CK1 has failed to operate (indicating that one of the necessary digits has too many or too few components or is missing entirely), the progress ground through contacts 6 of start 401 remains on conductor CK1 through back contact 3 of 406;

If 406 has operated but the second checking relay 411 has failed to operate, as an indication that insufficient adjustment information has been received from registers DR4 to DR7, conductor CK2 in 400D is grounded through back contact 5 of 411;

If 411 has operated but 412 is unable to operate, as by having a defective winding, conductor OP is grounded through back contact 5 of 412;

Conductor TR is grounded through back contact 17 of transfer relay 414 if that relay fails to respond to the operation of relay 412;

If relay 413 fails to respond to the operation of relay 414, checking conductor CK3 is grounded through back contact 2 of relay 413;

If all of the relays 406, 411, 412, 414, and 413 have operated and the controller has still failed to clear out, conductor CF in group 400D is grounded through front contact 2 of relay 413 as an indication of failure in the described final checking operation.

If the failure of the controller is because of the receipt of an unassigned (or vacant) number, vacant-number relay 410 stands operated as described, and conductor VN in group 400D is energized as a vacant-number signal, in addition to the energization of one or another of the progress conductors.

As described for the switch controller in the noted prior application, the clearing out of the adjustment controller may be initiated from the manual controller by way of the fault indicator 180, being effected by the temporary placement of ground on conductor CL in group 400D to operate the first clearout relay 403.

*Adjusting Potentiometers Without Adjustable Input Resistors*

Certain of the potentiometers P of FIGS. 1, 7, 8, and 9 may not have an adjustable input resistor associated therewith, or such resistor may be by-passed if present. In that event, the seventh digit may have the value 3 assigned thereto which causes relay P13 to be energized in the adjustment controller leaving the associated relays P11 and P12 restored. Contacts 1 of relay P13 secure the operation of the second checking relay 411. Since relay P13 has no contacts in the final checking circuit, the progress of the controller is not interfered with, which condition also obtains when a normal or starting-point adjustment is to be applied to the adjustable input resistor of a potentiometer.

Similarly relay A2 is operated without the operation of relay A1 when a normal adjustment is to be given to an adjustable amplifier AA, and relay R3 is operated without the operation of either R1 and R2 when a device AIR is to be given a normal adjustment.

FIG. 5—ADJUSTABLE AMPLIFIER AA500

As shown in FIG. 5, adjustable amplifier AA500 of FIGS. 1 and 9 comprises apparatus interconnected between the input conductor 501 and output conductor 502. The intervening apparatus comprises test apparatus 503 with terminals B, C, D, E, and F, together with a .1-ohm resistor 505 through which output conductor 502 is normally grounded; amplifier 504 having respective input and output conductors 509 and 502; condensers 506 and 507 having respective capacities of .001 and 1 m.f.; resistor 508 having a resistance of 1 megohm; and gating, adjustment and release relays 510, 511 and 512.

Amplifier AA500 is adjustable for summing and for integrating. It is conditioned for summing when relay 511 is normal, and is conditioned for integrating when relay 511 is operated. With relay 511 restored, input conductor 501 is connected through back contact 1 of 511 to input conductor 509 of amplifier 504; condenser 507 is short circuited at back contact 2 of 511, shunting the 1-megohm resistor 508 across input and output conductors 509 and 502, with conductor 502 being grounded through the 0.1 ohm resistor 505. The output of amplifier 504 is thereby caused to supply a summation output according to the total, or sum, of the increments of potential incoming over conductor 501.

When conversion of amplifier AA500 from summing to integrating is desired, gate relay 510 is operated over gating conductor 500 as described closing its contacts 1 and 2. Release relay 512 is thereupon operated temporarily over the associated conductor RL and contacts 2 of 510, as a standardized procedure used to release relay 511 if operated, following which conductor 47 is grounded. Relay 511 thereupon operates and prepares to lock operated through contacts of the restored relay 572, to ground through jumper 531, following which conductor RL is ungrounded to restore relay 510, leaving relay 511 locked operated. A moment later gating conductor 500 is ungrounded to restore gating relay 510, still leaving relay 511 operated.

Back contact 1 of 511 disconnects input conductor 501 from conductor 509; back contact 2 of 511 opens the shunt normally around condenser 507; and front contacts 1 and 2 of 511 connect input conductor 501 to the junction of resistor 508 and condenser 507, at the same time placing the small condenser 506 in parallel with condenser 507. The input potentials, to the extent that they vary in intensity (as alternating or undulating direct currents) tend to be shunted to ground through the parallel combination of condensers 506 and 507, in series with resistor 505. The input currents now reach input conductor 509 of amplifier 504 through the 1-megohm resistor 508.

When restoration of AA500 from integrating to summing is desired, the adjustment controller again grounds the associated conductors 500 and RL, but without grounding conductor 47, causing relays 510 and 512 to operate, thereby causing relay 511 to restore. The apparatus in FIG. 5 is left in normal condition when conductors RL and 500 in group 400B become ungrounded to permit relays 512 and 510 to restore.

FIG. 6—ADJUSTABLE INPUT RESISTOR AIR 600

As shown in FIG. 6, adjustable input resistor AIR600 is controlled by individual gating conductor 600 in group 400C, together with common conductors 41, 42, and RL. AIR600 comprises input and output conductors of 601 and 602, between which there is connected a three section resistor comprising 9-megohm section 603, .9-megohm section 604, and a .1-megohm section 605, for a total resistance of 10 megohms.

AIR600 further comprises gating relay 610, a pair of adjustment relays 611 and 612, and release relay 613. With relays 611, 612, in normal condition the full 10-megohms of resistance of the adjustable input resistor is connected in series between input and output conductors 601 and 602.

When a 1-megohm effective value of the input resistor is desired, conductors 600 and RL in group 400C are energized, operating relays 610 and 613 in succession as a standardized procedure whenever a new adjustment is to be imparted. Very shortly, conductor 41 is energized by the adjustment controller as described, operating 611 through contacts 1 of 610 to prepare a self locking circuit and contacts 2 of 611. The locking circuit of 611 becomes closed shortly thereafter, upon the restoration of relay 610, to leave relay 611 operate alone and locked to ground through its contacts 2, contacts 1 of relay 613, and jumper 631. With relay 611 operated and relay 612 restored, section 603 of the resistor is shunted at contacts 1 of relay 611, leaving in circuit between conductors 601 and 602 sectins 604 and 605 in series, having a total resistance of 1-megohm.

When the input resistor of FIG. 6 is to be adjusted for a .1-megohm resistance, relays 610 and 613 are again operated and relay 613 unlocks and restores relay 611. A moment later conductor 42 becomes grounded to operate relay 612 through contacts 2 of 610. A moment later, relay 613 is restored by the adjustment controller while conductor 42 of 400C is still grounded, whereupon relay 612 locks operated in place of relay 611, followed a moment later by the restoration of relay 610, leaving relay 612 operated alone and locked operated. Contacts 1 of relay 612 shunt sections 603 and 604 of the resistor, leaving in circuit between conductor 601 and 602 only the .1-megohm section 605.

When the full 10 megohm setting of AIR600 is again desired, conductor 600 and RL of 400C are again grounded to operate relays 610 and 613, but without ground on either of the conductors 41 or 42. Relay 612 is unlocked and restored at contacts 1 of relay 613. When relays 610 and 613 are shortly restored by the adjustment controller, all of the relays of FIG. 6 again stand restored.

FIG. 7—POTENTIOMETER P000

As shown in FIG. 7 potentiometer P000 of FIGS. 1 and 9 comprises resistors R1 to R10 and respectively associated adjustment relays 711 to 720 having the illustrated contact sets 1 to 3 for variously interconnecting these resistors all in series between input conductor 701 and ground, while variously connecting output conductor 702A to the resistor configuration according to the portion of the input voltage which is desired on output conductor 702A.

Associated individually with potentiometer P000 is an adjustable resistor for the next succeeding component, supplied by the output of the potentiometer. This input resistor comprises resistor sections R11 to R13, interposed between the potentiometer output conductor 702A and combined output conductor 702. Resistors R11 and R12 are arranged to be shunted by relays 721 and 722 as described for resistor sections 603 and 604 of FIG. 6. Any operated relay 711 to 722 is arranged to lock operated to ground through contacts of relay 723 and jumper 731. Release relay 723 is provided for unlocking and restoring any one of the relays 711 to 722 as a routine preliminary procedure whenever a new adjustment of either the potentiometer portion or the input-resistor portion, or both is to be effected. Gating relay 710 is energized over individual conductor 000 in group 400A when each of the first three digits of a number received by the adjustment controller is 0. Upon operating, relay 710 connects common conductors 1 to 10 in group 400A respectively to relays 711 to 720; connects conductors 71, 72, and RL of 400A respectively to relays 721, 722, and 723.

With all relays of FIG. 7 restored, input conductor 701 is connected over the indicated series arm SEA through back contacts 2 of relays 711 to 720, to output conductor 702A without any of the resistors R1 to R10 therein. At the same time, the indicated shunt arm SHA of the potentiometer (between output conductor 702A and ground) includes all of the resistors R1 to R10 in series, each being connected in arm SHA through back contacts 1 and 3 of its associated one of the relays 711 to 720 to ground at back contact 3 of relay 720. Also, with all relays of FIG. 7 restored, the three sections 911, 912, and 913 of the input resistor are connected between conductor 702A and conductor 702, for a total of 10 megohms between these points.

Conductor 702A may be extended for use as the output conductor when the adjustable input resistor R11 to R13 is not desired or is not provided, while conductor 702 may be extended for use as the output conductor if the adjustable input resistor for the next succeeding device is desired.

When any adjustment change is desired at the component shown in FIG. 7, gate conductor 000 in group 400A is energized by the adjustment controller, and common conductor RL of the group is energized causing relay 723 to unlock and restore any operated relay 711 to 722, following which any desired ones of the common conductors 1 to 10 are energized through the 1000-number, decimal-to-binary translator of the adjustment controller, along with either or neither of the conductors 71 and 72 over which input-resistor relays 721 and 722 are controlled. A moment later, release conductor RL in group 400A is deenergized to restore relay 723, thereby locking operated any operated ones of the relays 711 to 722, to ground through jumper 731, which operation is followed shortly by the restoration of gate relay 710.

FIG. 12—ADJUSTMENT PATTERN OF POTENTIOMETER

FIG. 12, comprising nine parts, FIG. 12A to FIG. 12I, illustrates the pattern of potentiometer adjustments imparted to the apparatus of FIG. 7 with various combinations of the relays 711 to 720 operated as a result of the receipt from the adjustment controller of various ones of one thousand binary-code numbers corresponding respectively to the one thousand decimal numbers 000 to 999, which are represented by the fourth, fifth, and sixth digits of seven digit numbers received and processed as described by the adjustment controller. The parenthetical notes in FIGS. 12A, 12I, refer to the relays 711 to 720 respectively as relays 1 to 10; indicate which of these relays are restored for the circuit configuration illustrated; and indicate the three-digit decimal number received by the adjustment controller (fourth, fifth, and sixth digits) to effect the illustrated adjustment. It will be understood of course that any of the ten relays are in operated condition unless indicated as restored.

*FIG. 12A—Setting 000*

In the all-restored condition indicated in FIG. 12A for the ten potentiometer-adjusting relays, the combined resistance of resistors R1 to R10 is all in the shunt arm SHA, and series arm SEA contains none of these resistors, thus directly connecting input conductor 701 to output conductor 702A, with both conductors 701 and 702A being grounded through the total resistance of resistors R1 to R10. As described for FIG. 7, series arm SEA now includes the serially related back contacts 2 of relay 711 to 720, and shunt arm SHA includes, in series with each of the resistors R1 to R10, back contacts 1 and 3 of its associated relay. As noted this all-restored adjustment condition of relays 711 to 720 is effected responsive to the fourth, fifth, and sixth digits comprising the number 000 (each digit zero), being the 1000th combination value that a three digit number can have in the decimal system. It has been arranged that the decimal adjustment numbers 001 to 999 (settings of DR4 to DR6) may be treated as decimal fractions .001 to .999, with the number 000 being treated as 1.000. Decimal setting number 000 may thus be read at 1000, and it indicates that 1000/1000 (all) of the input potential is delivered to the output conductor. The binary number into which the unity-ratio decimal number 000 is translated may be written as 0,000,000,000. This specific decimal-to-binary translation is effected in the detector field DF0 of FIG. 4 at vertical VO00 by effecting no rectifier tie points between vertical VO00 of DF0 and any of the associated horizontals H1 to H10.

*FIG. 12B—Setting 001*

FIG. 12B indicates the potentiometer setting secured in response to the decimal adjustment number 001 on registers DR4 to DR6. Number 001, treated as .001, indicates that 1/1000th of the input potential is to be applied to output conductor 702A. Translation of decimal number 001 to binary number 1,111,111,110 obtained at DF0 of the translator by supplying vertical VO1 thereof with translating rectifiers TR for each of the horizontals H1 to H9, causing operation of the first nine adjustment relays, and restorations of the tenth adjustment relay.

In FIG. 12B, with only the tenth relay restored, all of the ten resistors R1 to R10 are connected in series between input conductor 701 and ground, as they are in all circuit configurations possible with the potentiometer adjustment arrangement of FIGURE 7, but output conductor 702A is tapped into the series configuration between resistors R9 and R10. The resistance value of R10 which is only one resistance unit (100 ohms for example) as is indicated by the label "1R" applied thereto. Its resistance is 1/1000th of the total resistance of all of the resistors R1 to R10.

It will be observed from their labels "256R" to "1R" that, considered in reverse order, the resistors R1 to R9 have successive relative resistance values of 1, 2, 4, 8, 16, 32, 64, 128, and 256, in progressive binary relationship, giving a total resistance unit value for these nine resistors of 511 units. The final reverse-order resistor R1 has 489 units of resistance giving a total of 1000 units of resistance for the ten resistors.

More precisely, in the configuration of FIGURE 12B the resistors R1 to R9 of FIG. 7 are connected in the series arm SEA, between input conductor 701 and output conductor 702, by way of front contacts 1 and 2 at each of the operated relays 711 to 719, and continues from lever contact 2 of 719, through back contact 2 of the restored relays 720, to conductor 702A. The shunt arm SHA extends from conductor 702A, through the serially related contacts 3 of the operated relays 711 to 719, to lever contact 3 of relay 719, and thence to ground through resistor R10, by way of back contacts 1 and 3 of the restored relay 720.

*FIG. 12C—Setting 002*

Referring now to FIGURE 12C, the potentiometer setting there illustrated is controlled by decimal number 002 to provide .002 of the input potential on output conductor 702A, such setting being secured by the translation and transmission of potentiometer-setting binary number 1,111,111,101 by the adjustment controller translating rectifiers TR being correspondingly provided at vertical VO2 (not shown) of DF0 for all horizontals but H9. Consequently only relay 9 is restored in FIG. 12C, relays 1 to 8 and 10 being operated. In FIGURE 7, series arm SEA now extends from input conductor 701 through resistors R1 to R8, through front contacts 1 and 2 of each of the operated relays 711 to 718, to lever contact 2 of relay 718, whence it continues through back contact 2 of relay 719 to conductor 702A through resistor R10 and front contacts 1 and 2 of the operated relay 720. The shunt arm SHA now extends from conductor 702A through front contacts 3 of the operated relays 711 to 718 and thence through back contact 1 of relay 719, resistor R9, back contact 3 of relay 719, and front contact 3 of relay 720, to ground. Since resistor R9 included in the shunt arm SHA has two of the one thousand units total of potentiometer resistance, the drop across output conductor 702A is .002 of the potential drop from input conductor 701 to ground.

*FIG. 12D—Setting 003*

FIGURE 12D illustrates the potentiometer setting in response to binary number 1,111,111,100, corresponding to the decimal number 003, to provide output conductor 702A with .003 of the potential of input conductor 701. For this purpose the 9th and 10th relays are restored to include resistors R9 and R10 in shunt arm SHA, which now traverses front contacts 3 of the operated relays 711 to 718, and extends thence to ground through resistors R9 and R10, by way of back contacts 1 and 3 of relays 719 and 720, giving three units of resistance in the shunt arm to supply .003 of the input potential to output conductor 702A.

Resistors R1 to R8 are now in the series arm SEA, which extends through front contacts 1 and 2 of relays 711 to 718, to lever contact 2 of relay 728, extending thence through back contacts 2 of relays 719 and 720 to conductor 702A.

*FIG. 12E—Setting 511*

Carrying forward from the explained settings according to FIGURES 12B, 12C, and 12D, it is evident that the setting for decimal number 004 comprises the four-unit resistor R8 alone in the shunt arm SHA (the eighth relay 718 restored alone), and that the settings of FIGS. 12C and 12D are repeated for setting the next three setting numbers 005 to 007, but with the eighth relay 718 restored. By extension, it is evident that the settings for succeeding decimal numbers follow the progressive procedure until the setting according to number 511 (FIG. 12E) occurs wherein the first relay 711 is operated alone, with all other relays 712 to 720 restored. There is thus provided a total shunt-arm resistance of 511 ohms, .511 of the input potential being impressed on output conductor 702A.

In FIG. 7 the setting of FIGURE 12E (for decimal number 511, ratio .511) is with a relay 711 operated and 712 to 720 restored, extending shunt arm SHA from conductor 702A, through front contact 3 of relay 711, to ground through resistors R2 to R10, by way of back contacts 1 and 3 of each of the relays 712 to 720. Series arm SEA then extends from 701, through resistor R1, by way of front contacts 1 and 2 of relay 711, and thence by way of back contacts 2 of relays 712 to 720 to conductors 702A.

*FIGS. 12F to 12I—Settings 512 to 599*

It will be observed that in the adjustment of FIGURE 12E for decimal number 511 and ratio .511 (all of the resistors except R1 in the shunt arm, leaving resistor R1 alone in the series arm) is the highest ratio of output potential to input potential which can be obtained without employing the 489-unit resistor R1 in the shunt arm of the potentiometer, by having the corresponding relay 711 restored. As a consequence, the potentiometer setting in response to all decimal numbers 512 to 999 include resistor R1 in the shunt arm (relay 711 restored), which is indicated for the typical settings illustrated in FIGURES 12F to 12I.

The potentiometer-relay settings for numbers 512 to 999, typical examples of which are shown in FIGURES 12F to 12I as noted are special relay settings in that they comprise a departure from the orderly decimal-to-binary translation of numbers 001 to 511. This translation departure is made because a ten-digit binary number provides 1024 values, which is more than the noted one thousand potentiometer settings and the noted one thousand values of the three-digit decimal numbers 000 to 019.

A logical strictly binary arrangement of the resistors R1 to R10 is one in which resistor R1 contains 512 units of resistance, twice as many units as resistor R2. Resistor R1 however has deliberately been provided with only 489 units of resistance, to give a total of 1000 units of R1 to R10 resistance to coincide with the noted maximum number of values of a three-digit decimal number. This progression departure simplifies the potentiometer, and it causes no difficulty in the adjustment controller, for the described translator thereof can translate any three-digit decimal number into any desired ten-digit binary number by a translation having no necessary relationship to the other decimal-to-binary translations.

In the decimal-number 512 setting illustrated in FIGURE 12F, in addition to relay 1 being restored, to place the 489 units of resistor R1 in shunt arm SHA, relays 6, 8, 9, and 10 are restored to thereby include their resistors R6, and R8 to R10 (totaling 23 units) in the shunt arm SHA, for a total shunt arm resistance value of 512 units. The remaining of the 1000 resistance units are in the series arm SEA as represented by the sum of the resistance units in R2 to R5 and R7. The binary number for this setting is 0,111,101,000, rather than bianry number 0,111,111,111, logically assigned to decimal number 512.

Aside from the translation departure noted of the potentiometer setting of FIGURE 12F in accordance with the decimal number 512, the binary numbers and settings for decimal numbers higher than 512 follow an orderly pattern which terminates in the settings according to decimal numbers 997 to 999 (binary numbers 0,000,000,011 to 0,000,000,001), as indicated in FIGURES 12G, 12H, and 12I.

In FIGURE 12G for decimal number 997, relays 1 to 8 are restored, thus placing all resistors in the shunt arm except R9 and R10, for a total shunt-arm resistance of 997 ohms; in FIGURE 12H for decimal number 998, relays 1 to 8 and 10 are restored to place all resistors except R9 in the shunt arm, for a total shunt-arm resistance of 998 units; and, in FIG. 12I for decimal relays 1 to 9 are restored, placing resistors R1 to R9 in the shunt arm for a total shunt-arm resistance of 999 units.

Following decimal number 999 (binary number 0,000,000,001) is the final number 000 of the series of one thousand three-digit decimal numbers (binary number 0,000,000,000), the adjustment result of which is illustrated in FIGURE 12A, wherein all of the adjustment relays are restored, and all of the resistors R1 to R10 are in the shunt arm SHA providing a total shunt-arm resistance of 1000 units, for the noted 1000:1000 (or 1:1) ratio of output potential to input potential.

Referring further to FIGURES 12F to 12I, where the number of units of resistance included in the shunt arm correspond respectively to the decimal numbers 512 to 999, since the 489 units of resistance contained in resistor R1 is 23 units of resistance less than would be contained in that resistor if the resistance thereof were 512 units to permit the corresponding binary number to accord exactly with the binary system, each of the decimal adjustment numbers 512 to 999 may be regarded as effecting a translation into the binary system that logically belongs to a decimal number which is 23 higher. This is evident in FIGURE 12F, wherein relays 6 and 8 to 10 are restored along with relay 1 to introduce a total of 23 units in shunt arm SHA in addition to the 489 resistance units of R1.

FIG. 8—MODIFIED POTENTIOMETER P000′

Potentiometer P000′ of FIG. 8 is the potentiometer P000 of FIG. 7 modified to accept a logical unbroken series of 999 binary numbers representing decimal-to-binary translations of decimal-system numbers 001 to 999. Such a potentiometer is of special utility in an adjustment system employing a known form of fixed translator which is unable to add 23 to each decimal number 512 to 999, as is effectively done, as described by the translator of FIG. 7.

In FIGURE 8 adjustment relays 811 to 823 correspond to relays 711 to 723 of FIG. 7, the gating relay and the locking circuitry for relays 811 to 823 being omitted in view of their disclosure in FIG. 7. The resistors R1 to R13 of FIG. 8 correspond respectively to resistors R1 to R13 of FIG. 7 but with the modifications indicated for the tapped resistors R1 to R5 and resistor R7 of FIG. 8. Resistor R1 of FIGURE 8 is increased from a value of 489 resistance units as in FIGURE 7 to a value of 512 resistance units, thus giving a total value of 1023 resistance units of R1 to R7 of FIG. 8, to accord with the decimal equivalent (1023) of binary number 0,000,000,001.

Resistor R1 of FIG. 8 is tapped to provide two sections of 23 units and 489 units respectively; R2 of 128 total resistance units, is tapped to provide two sections of 23 and 233 resistance units; R3, of 128 total resistance units, is tapped to provide two sections of 23 and 105 resistance units; R4, of 64 resistance units total, is tapped to provide two sections of 23 and 41 resistance units; R5, of 32 resistance units, is tapped to provide two sections of 23 and 9 resistance units respectively; and resistor R7, of 8 resistance units total, is tapped to provide two sections of 7 and 1 resistance units.

Resistors R1 to R10 of FIG. 8, considered as untapped resistors, are controlled by contacts 1 to 3 of relays 811 to 820 as is done in FIG. 7 by relays 711 to 720 for the resistors R1 to R10. The arrangement in FIG. 8, as in FIG. 7, is such that the one of the resistors R1 to R10 which is associated with an unoperated relay 811 to 820 is included in the shunt arm SHA and is excluded from the series arm SEA, the operation of any one of the relays 811 to 820 removing the associated one of the resistors R1 to R10 from the shunt arm and placing that resistor in the series arm.

Relays 811 to 815 and 817 are each provided with additional contacts 4 which control the tap connections to the respective tapped ones of the resistors. Briefly, the arrangement is such that, for each true binary combination of the relays 811 to 820 which corresponds to any decimal number 001 to 999 (binary numbers 1,111,111,110 to 0,000,011,000) removes 23 resistance units from the series arm SEA making the total effective series-arm and shunt-arm resistance one thousand units, instead of the 1023-unit total of all of the resistors R1 to R10 of FIGURE 8.

The following table which applies specifically to FIGURE 8 illustrates the decimal to binary translation (or rather the result of such translation with respect to relay operation) of selected and illustrative numbers from 001 to 999.

*FIG. 8 Relay Table.*

| Decimal Nos. | Relays Operated | | | | | | | | | |
|---|---|---|---|---|---|---|---|---|---|---|
| | 1 | 2 | 3 | 4 | 5 | 6 | 7 | 8 | 9 | 10 |
| 001 | X | X | X | X | X | X | X | X | X | - |
| 002 | X | X | X | X | X | X | X | X | - | X |
| 003 | X | X | X | X | X | X | X | X | - | - |
| 511 | X | - | - | - | - | - | - | - | - | - |
| 512 | - | X | X | X | X | X | X | X | X | X |
| 767 | - | X | - | - | - | - | - | - | - | - |
| 768 | - | - | X | X | X | X | X | X | X | X |
| 895 | - | - | X | - | - | - | - | - | - | - |
| 896 | - | - | - | X | X | X | X | X | X | X |
| 959 | - | - | - | X | - | - | - | - | - | - |
| 960 | - | - | - | - | X | X | X | X | X | X |
| 991 | - | - | - | - | X | - | - | - | - | - |
| 992 | - | - | - | - | - | X | X | X | X | X |
| 999 | - | - | - | - | - | X | X | - | - | - |
| 000 | - | - | - | - | - | - | - | - | - | - |

In the above table the relays 811 to 820 are indicated respectively by the numbers 1 to 10. Under each relay number, the letter X indicates that the relay is operated when applied opposite any decimal number shown, while a hyphen is employed under the relay and opposite any decimal number to indicate that the relay is unoperated in response to that decimal number. This table shows that the FIG. 8 decimal-to-binary translation for decimal numbers 001, 002, 003, and so forth to 511 is as described, for the FIG. 7 device in connection with FIGS. 12B to 12E. Consequently, for decimal numbers 001 to 511, the shunt arm SHA of FIG. 8 is provided with 1 to 511 units of resistance, respectively.

It will be observed that relay 811 is operated for all decimal numbers 001 to 511 to include resistor R1 in the series arm SEA. Contacts 4 of 811 render effective the shunting path SEA′ of series arm SEA, which extends through front contact 4 of relay 811 to the point of resistor R1, thereby shunting the 23-unit left hand portion of resistor R1 out of the series arm, thus reducing the total of 1023 units for R1 to R10 to 1000 units, thus arriving at the same ratio of output potential to input potential for decimal numbers 001 to 511 as described for FIGURE 7.

When operated, for all decimal numbers 001 to 511, relay 811, by opening its back contact 4, disables contacts 4 of relays 812 to 815 and 817, to limit the resistor shunting to 23 units.

The first translation departure with respect to FIGURES 7 and 8 occurs at the decimal number 512. For FIGURE 7, as shown by FIGURE 12F for the decimal number 512, relays 6, 8, 9, and 10 are restored in addition to relay 1, while the above FIGURE 8 table shows that for the same decimal number (512) relay 1 (811 of FIGURE 8) is restored alone and all of the other relays 2 to 10 being operated. For this decimal number translated and supplied to FIG. 8 the 512 resistance units of resistor R1 are included in the shunt arm SHA through back contacts 1 and 3 of the unoperated relay 811, to ground through contacts 3 of the operated relays 812 to 820, and the combined resistance of resistors R2 to R10 is included in the series arm SEA through back contacts 2 of relay 811 and front contacts 1 and 2 of relays 812 to 820. With 811 restored and 812 operated, the 23 unit left hand section of resistor R2 however is shunted out of the series arm SEA, over alternate path SEA′, through back contact 4 of relay 811, and front contact 4 of relay 812, thus reducing the series-arm resistance by 23 units for a total effective potentiometer resistance of 1000 units.

As shown by the FIGURE 8 relay table, the second relay (812) is operated for all decimal numbers 512 to 767 to the same effect.

For all decimal numbers 768 to 895 the first and second relays are restored, and the third relay is operated. The shunt path SEA' is then extended through back contact 4 of relays 811 and 812 and through front contact 4 of relay 813 to shunt the 23-unit section of resistor R3 out of the series arm SEA.

As shown by the above table, the first to third relays of FIG. 8 are restored, and the fourth relay is operated, for decimal numbers 896 to 959. For any of these numbers, the shunt path SEA' is extended through back contact 4 of relays 811 to 813 and front contact 4 of relay 814 to the tap point of resistor R4, thereby shunting the 23-unit section of R4 from the series arm SEA.

The table shows that decimal numbers 960 to 991 cause the first four relays to be restored and the fifth relay to be operated. Under this condition, the shunting conductor SEA' is extended through front contact 4 of relays 811 to 814, and thence through front contact 4 of relay 815 to the tap point of resistor R5, thereby shunting the 23-unit section thereof from the series arm SEA.

The above table shows that decimal numbers 992 to 999 cause the first five relays to be restored and the sixth and seventh relays to be operated. Under this condition, conductor SEA' is extended through back contact 4 of relays 811 to 815 and thence through front contact 4 of relay 817 to the tap point of resistor R8, thereby shunting from the series are SEA the 16-unit resistor R6 and the left hand 7-unit portion of resistor R7, to remove 23 resistance units from the series arm to make the total effective potentiometer resistance 1000 units for this group of numbers.

When the decimal number received for the device of FIGURE 8 is 000, indicating a 1:1 ratio of output potential to input potential, the translator of the adjustment controller departs from the translational arrangement for numbers 001 to 999 to the extent necessary to cause all of the ten potentiometer adjusting relays to be restored. Thereby, series arm SEA of FIGURE 8 is extended through back contacts 2 of relays 811 to 820 to output conductor 802A. At the same time, the resistors R1 to R10 are all included in the shunt arm between conductor 802A and ground through back contacts 1 and 3 of each of the relays 811 to 820. At this time, no attempt is made to shunt out any portion of any of the resistors, thus permitting the total shunt-arm resistance for the unit decimal number 000 to equal 1023 units. The additional 23 resistance units in the shunt arm has no disturbing effect on the ratio of output potential to input potential, since the ratio remains 1:1 (direct connection of input and output conductors 801 and 802A) irrespective of the number of resistance units included in the shunt arm SHA.

FIG. 9—SYSTEM CABLING

Referring particularly to FIG. 9, a preferred orderly arrangement for cabling together the switching network SN100 of FIGURE 1, and the groups of computer components for efficient and flexible use will be described.

FIG. 9 shows a distributing frame DF, preferably of the well known two-sided construction, which provides separate terminal groups 901 and 902 on the two sides of the frame. Terminals 901 and 902 are respectively output and input terminals of the illustrated components. 901 and 902 are arranged in groups, as indicated, with only the first terminal and last terminal of each group being shown. Jumpers, of which jumpers 931 to 936 are illustrative examples, may be extended from the desired output terminals 901 to respective terminals 902 to effect any desired grouping pattern among the computer components and switching network terminals. These jumpers may be run neatly through the usual jumper rings (not shown). The jumpers employed on frame DF are readily changeable as from time to time desired, compared to the relatively permanent cabling connections of the computer components to frame DF, the jumpers may be referred to as "temporary" connections or jumpers.

SN100 of FIG. 9 represents the entire switching network SN100 of FIG. 1, with its 480 single-conductor input lines IL000 to IL479 and its 480 single-conductor output lines OL000 to OL479. The input lines IL are cabled to respective terminals of input group 902, and the output lines OL are cabled by way of conductors in group 900 to respective output terminals 901.

Signal sources S, may represent respective constant-voltage sources of direct-current or of low-frequency alternating current, in accordance with accepted analog-computer practice. Illustrated are the first and the last, respectively, of a group containing any desired number of such sources S. They are connected over respective first and last conductors 922F and 922L in group 900, to respective terminals on the output side 901 of frame DF.

There is shown at R the first and the last of a group of recording devices of any type desired or suitable for analog computer work, such as A.C. or D.C. voltmeters or ammeters, either of the direct-reading or of the pen-recording types. They are connected over first and last conductors F and L of group 912 to respective input terminals 902.

There is indicated at P a group of 500 adjustable potentiometers of which only the first and last (000 and 479) are shown. The input conductors 913 of potentiometers P are connected to respective terminals in input group 902, while the output conductors 923 of potentiometers P are connected to respective terminals in input group 901. Potentiometers P are controlled over conductor group 400A of FIGS. 1, 4 and 7.

The input and output conductors 914 and 924 of a group of fixed amplifiers FA are connected to respective input terminals 902 and output terminals 901.

AA in FIG. 9 indicates a group of one hundred adjustable amplifiers designated respectively 500 to 599, being the amplifiers AA of FIG. 1, the adjustment arrangement for any one of which being as disclosed in FIG. 5 for AA500. The input conductors 915 of these amplifiers are connected to respective input terminals 902, while their output conductors 925 are connected to respective output terminals 901.

FIR of FIG. 9 indicates a group of fixed input resistors as for an amplifier or other computer component. Their input conductors 916 are connected to respective input terminals 902, and their output conductors 926 are connected to output terminals 901.

AIR of FIG. 9 indicates a group of 100 adjustable input resistors numbered respectively 600 to 699, being resistors AIR of FIG. 1, the adjustment arrangement for AIR600 being shown in FIG. 6. It is controlled by conductors in group 400C as indicated in FIGS. 1 and 9 and as shown in detail for AIR600 in FIG. 6.

MC of FIG. 9 indicates a group of miscellaneous components such as may be required in the computer system. Their input and output conductors 918 and 928 are connected respectively to associated input terminals 902 and output terminals 901.

*Grouping of Computer Components*

The computer components may be grouped as desired into sub-groups which can be interconnected into desired readily changeable problem groups, as by the installation of jumpers at DF, of which jumpers 931 to 937 are illustrative examples.

Jumpers 931 are employed to connect certain desired current sources S to respective input lines IL of switching network SN100 of FIGS. 1, 9, 11, of which the output lines OL may be connected (as by respective jumpers 932) to the input conductors of any desired one of the computer components.

Through switching network SN100, the sources represented by jumpers 937 may be connected to any desired respective outlet lines OL, such as those which are extended by jumpers 932 to input conductors 913 of respective potentiometers P.

Output conductors 923 of components P may be extended by jumpers to desired input lines IL, or may be extended to desired other components, as by jumpers 933 which extend to input conductors 915 of respective adjustable amplifiers AA.

Output conductors 925 of components AA may be extended, as by jumpers 934, to input conductors such as 917 of adjustable input resistors AIR. The two illustrated jumpers 934 may both extend to the input conductor 917 of the same component, to accord with common computer practice where signals from two or more variably adjustable source channels are combined on their way toward recording devices R.

Output conductors 927 of components AIR may be extended to any desired input conductors or input lines IL. One such extension may be over jumper 935 to an input conductor 918 of a miscellaneous component MC.

Output conductors 928 of components MC may be extended to input conductors of any desired components, or any one or more may be extended, as over jumper 936 to an input line IL of SN100, whence it may be extended over an outlet line OL (with a suitable IL-OL connection at SN100) and a jumper such as 937 to the inlet conductor of a desired recorder R.

FIG. 10—SECTIONAL CONTROL

Figure 10:
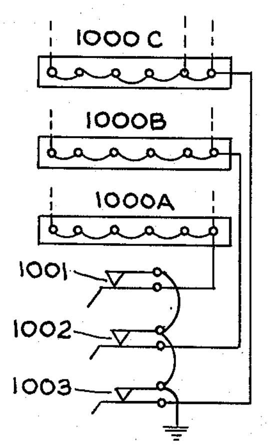
FIG. 10 is a wiring diagram of apparatus for controlling the system in separate problem or program sections.

Referring to FIG. 10, since an analog computer installation embracing a sufficient number of components to handle a very large and complex problem contains sufficient channels and components to handle two or more smaller problems contemporaneously when no extremely large problem is being handled, the sectionalized control apparatus of FIG. 10 is provided. It enables the channels and components of the computer system to be handled efficiently in separate sections, three in the illustrated example, with provisions for selectively releasing all switching-network interconnections and the remotely controlled adjustments of any section whenever desired. For this purpose, the arangement of FIG. 10 comprises three ground-supply bus bars 1000A, 1000B and 1000C, associated with the respective sections and from which hold-current jumpers may be extended to each switching channel and adjustable component of the section.

Bus bars 1000A to 1000C are separately supplied with a holding ground connection, as by the respective release keys 1001, 1002 and 1003. Actuation of any one of these three release keys removes holding ground from its associated bus bar, thereby clearing out all switching apparatus and adjustable components of the associated section of the computer installation.

In FIGS. 5, 6, and 7, the ground-supply terminals 532, 632, and 732 may each be a terminal of, or a terminal supplied with holding ground through, one or another of the bus bars 1000A to 1000C and release keys 1001 to 1003. Accordingly actuation of any key 1001 to 1003 to deprive its bus bar 1000A to 1000C releases all adjustable components according to FIGS. 5 to 7 which depend thereon for holding current.

At the same time all connections through network SN100 pertaining to the section being cleared out through actuation of a key 1001 to 1003 are cleared out as described hereinafter in connection with FIG. 11.

FIG. 11—CALL-THROUGH CIRCUIT DIAGRAM

In the call-through circuit diagram shown in FIGURE 11 for the switching network SN100, a portion is shown of switch A of switching groups PG1, LG1, and SG1 of FIG. 1, involved in the illustrated circuit connection between input line IL000 and output line OL000. This connection is from the single-conductor input line IL000 to the single-conductor output line OL000 by way of tip conductors T of the switchboard and contacts of the illustrated switch portions and includes primary link PL1-1 and secondary link SL1-1. Through the switchboard, however, the illustrated established connection includes a local, or sleeve conductor S in addition to the tip conductor T over which the lines are interconnected. Sleeve conductor S is included for the usual holding and busy-test purposes.

As explained in detail in the noted prior application, such a connection is established by the switch controller upon the receipt of a six-digit number, of which the first three digits index the input line IL to be connected, and the last three digits index the output line OL with which it is to be connected. In operation, the switch controller first causes the connection to be established through the switch contact sets and links such as those illustrated in FIGURE 11, but withholds operation of the individual line relays such as PLR and SLR until a test connection made over conductor pairs PV and SV verifies that the connection is otherwise complete, and until it is verified under switch-controller control that neither of the lines involved is in use as indicated by its individual sleeve conductor S. If the sleeve-conductor test shows that either of the lines is already connected through the switchboard, the switch controller is precluded from finally completing the connection by operating relays PLR and SLR. On the other hand, if the vertification and sleeve-conductor tests are favorable, the switch controller, (having caused hold magnet H1 of each group PG1, LG1, and SG1 to close its illustrated crosspoint contacts to prepare the connection) causes each of the relays PLR and SLR to be operated, each by its lower winding, to complete the connection, following which the controller is retired from the connection, as explained in the noted prior application.

Upon the operation of relays PLR and SLR, holding ground is supplied to the sleeve conductor S of the established connection through the low resistance upper winding of relay PLR, thereby supplying holding current to hold magnet H1 of each of the illustrated switches of PG1, LG1, and SG1 over the established connection, and supplying holding current to the upper winding of relay SLR through the contacts of relay SLR. Accordingly, the connection is locked in a holding condition and remains intact until it is to be taken down.

As explained in the noted prior application, the switch controller is able to effect a three-digit release connection to the switchboard apparatus associated with any connected input line, to thereby place ground directly on the conductor S individual to that line. For line IL000 the upper winding of relay PLR is thereby shunted to cause that relay to restore, following which the noted ground on the sleeve conductor of the line is removed by the switch controller. The illustrated hold magnets, and the secondary line relay SLR of the connection thereupon restore completing the breaking down of the connection between the input and output lines.

The noted prior application points out that all of the connections through the switching network may be restored by the removal of the current supply from the entire switchboard, and it discloses that the connections through the switch network may be released in sections, as by the actuation of a separate release key for each twenty input lines. As FIG. 11 indicates however, each input line IL is provided with a separate holding jumper such as is shown at 1101 for line IL000. Each such holding jumper is extended to the one of the three holding bus bars 1000A to 1000C of FIGURE 10 which corresponds to the section into which the input line is placed. The input lines may thus be assigned to sections arbitrarily and without any necessary relationship to the physical order in which the lines terminate at the switchboard. Then when one of the keys 1001 to 1003 is operated to remove ground from the corresponding one of the bus bars 1000A to 1000C, all of the hold-ground jumpers, such as 1101, connected to such bus bars are ungrounded, causing each associated connection through the switching network to become restored as described. This occurs at the same time that all adjustable components (such as those of FIGURES 5 to 7) assigned to the same section of the computer installation are restored to normal. All of the switching and adjustment components of the section are thus in normal condition in readiness for a new program or problem.

Referring again to FIG. 11, connections ILX and ILY are intended to indicate multiple connections (preferably jumpers, not shown, of DF of FIG. 9) between two or more input lines for signal-spreading purposes as where a single (simple or composite) source of signals is to be connectable through the network to two or more output lines OL. The indicated multipling of input line IL does not affect the noted test made for existing connections of input lines, as it excludes the individual sleeve conductors S of the multiplied input lines.

Connections OLX and OLY similarly indicate multiple connections (preferably jumpers at DF of FIG. 9) which may be made between output lines OL when desired and without affecting the noted test for an existing connection.

We claim:

1. A combined switching and adjustment system for a group of electrical components arranged to interact according to interconnections effected between them and according to the electrical characteristics of the respective interconnected components, at least some of the components each including remotely controllable means individual thereto for adjusting its electrical characteristics, means including remotely controllable switching apparatus for effecting and severing said interconnections, means for transmitting number groups of switching signals and for transmitting number groups of adjustment signals, each number group of switching signals indexing a separate desired interconnection change, each number group of adjustment signals indexing any desired adjustable component and indexing any desired adjustment of such component, means responsive to the transmission of any said number group of switching signals for operating the remotely controllable switching apparatus in the switching network to effect the indexed interconnection change, and means responsive to the transmission of any said number group of adjustment signals for selecting the indexed adjustable component and for actuating the remotely controllable adjusting means thereof to effect the indexed adjustment.

2. In a system according to claim 1, a switch controller for receiving the said number groups of switching signals and for causing the said operations of the said remotely controllable switching apparatus to occur, an adjustment controller for receiving the said number groups of adjustment signals and for causing the said selection of adjustable components and the said actuation of the remotely controllable adjustment means thereof to occur, a receiver interposed between the said transmitting means and the said controller, means in the receiver for receiving said transmitted groups of signals in succession, the signal groups pertaining to at least one controller each including signal information distinguishing such signal group from the signal groups pertaining to the other controller, controller-selecting means in the receiver and means for controlling it according to the said signal information to select the controller to which any received signal group pertains, and means in the receiver for directing signals to either selected controller according to the signals of the group currently received.

3. In a system according to claim 1, wherein all said number groups of signals are transmitted over the same transmitting medium, and wherein the said number groups of switching signals contain signals similar to signals contained in the said number groups of adjustment signals, means for distinguishing between the said two categories of number groups of signals which comprises transmitting in association with each signal group of at least one of the two categories signal information distinguishing such signal group from the signal groups of the other category.

4. In a system according to claim 1, wherein the numbers represented by the number groups of signals of each of the two specified categories include normal numbers and short numbers, the normal numbers of a category each containing a certain number of digits which is normal for the category, while each short number of such category contains a certain smaller number of digits, start means included in each of the two said means responsive to transmission, the start means normally requiring the transmission of the said normal number of digits for the concerned category to render it effective, the said transmitting means including means for transmitting signal information distinguishing between normal numbers and short numbers of the same category, and means controlled by the last said signal information for rendering the said start means effective responsive to the transmission of the said smaller number of digits of a said short number of either category.

5. In a system according to claim 4, the said means for transmitting distinguishing information comprising means for transmitting a distinguishing signal for each said short number.

6. A combined switching and adjustment system for a group of electrical components arranged to interact according to which of a number of patterns of interconnections is effected between them and to react according to the electrical characteristics of the respective interconnected components of any said pattern, at least some of the components each including remotely controllable means for adjusting its electrical characteristics, means including a switching network for effecting any desired one of the said interconnections, the last said means including remotely controllable switching apparatus included in the switching network, means for transmitting number groups of switching signals according to any said pattern of interconnections and for transmitting number groups of adjustment signals, each number group of switching signals indexing a separate desired interconnection, each number group of adjustment signals including first signals indexing any desired adjustable component and including second signals indexing any desired adjustment of the indexed component, means responsive to the transmission of any said number group of switching signals for operating the remotely controllable switching apparatus in the switching network to effect the indexed interconnection, and means responsive to the transmission of any said number group of adjustment signals for selecting the indexed adjustable component and for actuating the remotely controllable adjusting means of the selected component to effect the indexed adjustment thereof.

7. In a system according to claim 6, a distributing frame having terminals for receiving permanent connections and for receiving temporary inter-terminal jumper connections, the said switching network including a group of input terminals and a group of output terminals, with said switching apparatus being operable to connect any idle input terminal of the network to any idle output terminal thereof, each of a number of the said components including an input terminal and an output terminal, certain other of the said components comprising sources having respective output terminals, while still other components comprise receivers having respective input terminals, cabling means including conductors permanently connecting all said switching-network and component terminals to respective terminals of the distributing frame for variable interconnections thereat by temporary jumpers which accord with such patterns of interconnections as may be desired from time to time.

8. In a system according to claim 7, wherein certain of the said jumpers interconnect certain of the said network terminals to respective ones of the said component terminals, and others of the said jumpers connect other ones of the said component terminals respectively to still other ones of the said component terminals.

9. An adjustment system for a group of interconnected electrical components arranged to interact according to the electrical characteristics of the respective interconnected components, at least some of the components being adjustable components each including remotely controllable means individual thereto for adjusting its electrical characteristics, means for transmitting number groups of adjustment signals in succession, each such number group indexing any desired adjustable component and indexing any desired adjustment of such component, means responsive to the transmission of any said number group of adjustment signals for selecting the indexed adjustable component and for actuating the remotely controllable adjusting means thereof to effect the indexed adjustment, the said adjustable components being divided into separate groups, an adjustment controller for receiving in succession the said transmitted number groups of signals, the adjustment controller including receiving apparatus and means for setting it in accordance with each received number group of signals, the said means for selecting the indexed component including a separate group of adjustment conductors for each separate group of adjustable components, together with first means controlled according to the setting of the receiving apparatus for rendering temporarily individual to the adjustable component indexed by the received number group of signals the adjustment conductors comprising the group thereof associated with the component group containing the indexed component, and the said means for actuating the said remotely controllable adjustment means of the individualized controller including second means controlled according to the setting of the receiving apparatus for applying a selective marking to the adjustment conductors of the last said group thereof according to the adjustment indexed by the received number group of signals.

10. An adjustment controller for use in an adjustment system for a group of separately adjustable electrical components each including means for variably adjusting an electrical characteristic thereof, the adjustment controller including recording means for temporarily recording in succession a series of transmitted adjustment numbers each indicative of a desired component and indicative of a desired adjustment thereof, and selecting and operating means in the controller effective upon any said recordation of an adjustment number to select the indicated component and to operate the adjustment means thereof to effect the indicated adjustment, the said recording means including a first and a second set of digit registers corresponding respectively to the digits of an adjustment number, means for setting the registers of the first set according to the respective values of the digits of a received number, start means for checking the accuracy of the setting of the registers of the first set, means controlled by the start means for setting the registers of the second set to accord with the respective settings of the registers of the first set, the said means for selecting and for effecting adjustment including the registers of the second set.

11. An adjustment controller according to claim 10, wherein each of the said registers comprises a group of relays, and wherein the digits of the adjustment numbers are transmitted in code and are recorded in code by the registers of the first set, each register of the first set including means for decoding the digit recorded thereon and for setting the corresponding register of the second set according to the decoded value of such digit.

12. In an adjustment controller according to claim 10, the said recording means including a first and a second set of digit registers, with the registers of each set comprising groups of relays settable to record the respective digits of an adjustment number, the digits of the adjustment numbers being recorded in code by the registers of the first set, means for setting the registers of the second set to accord with the respective settings of the registers of the first set, each register of the first set including means for decoding the digit recorded thereon and for setting the corresponding register of the second set according to the decoded value of such digit, the said means for selecting and for effecting adjustment including the registers of the second set.

13. In an adjustment controller according to claim 12, the relays of each register of the said second set corresponding respectively to digit values recordable on the register, a checking relay included in the said progress relays, and means including a checking chain extending serially through the registers of the second set for operating the checking relay dependent upon any relay being operated alone in each of the registers of the second set.

14. In an adjustment controller according to claim 12, the registers of the said second set comprising two groups, means including an inter-register relay tree of contact sets of the relays of the registers of the first group for determining the said component to be selected, and means including contacts of the relays of the registers of the second group for determining the said adjustment of the selected component to be effected.

15. In an adjustment controller according to claim 14, the said components comprising groups differing as to the number of digits required in an adjustment number to determine an adjustment thereof, and means controlled by the setting of the registers of the said first group for selecting the registers of the said second group whose said contacts are to be included in the said means for determining adjustment.

16. In an adjustment controller according to claim 12, the registers of the said second set comprising two groups, with contact sets of the relays of each group comprising a separate inter-register relay tree, means including one relay tree for determining the said component to be selected, and means including the other relay tree for determining the said adjustment of the selected component to be effected.

17. An adjustment system for a group of separately adjustable electrical components with each component including a separate group of relays having a normal adjustment position and at least one off-normal adjustment system to correspondingly adjust an electrical characteristic of the component, comprising conductor means common to the components, component selecting means for temporarily connecting the common conductor means individually to any desired component, means for selecting an adjustment contemporaneously with any said individualization, means for positioning the said relays of any individualized component over the conductor means to accord with the contemporaneously selected adjustment, and means controlled over the common adjustment conductor means for each selected adjustment for placing the group of relays of any said individualized component in its normal adjustment position from any currently occupied off-normal position, the said means for positioning the group of relays of an individualized component comprising means for maintaining such relays in one of their said adjustment positions according to the adjustment which is contemporaneously selected.

18. An adjustment system according to claim 17, wherein the said component-selecting means comprises gate relays associated respectively with the components and means for operating the gate relays selectively, the said common conductor means being normally disconnected from the components, each gate relay having contact means for connecting the common conductor means operatively to the relay apparatus of the associated component.

19. An adjustment system according to claim 17, wherein the said relay apparatus comprises at least one adjustment relay requiring a flow of current to operate it and requiring a continued flow of current to hold it operated, the said common conductor means including at least one operating conductor over which a said adjustment relay may be operated in any individualized component and including a release conductor, means for supplying current to hold the operated adjustment relays in the components, and means including the said release conductor for depriving any operated relay of an individualized component of holding current.

20. In and adjustment system according to claim 19, each said adjustment relay including self-locking contacts for closing a self-holding circuit, and the said means for depriving any operated relay of an individualized component of holding current including a separate release relay for each component.

21. Adjustment relay apparatus for a component of a group of components which are selectively adjustable over a common conductor group, comprising a gate relay, a release relay, and at least one adjustment relay, the gate relay being operatively connected to a gate conductor individual to the component, and having contacts for connecting the release and adjustment relays operatively to respective conductors in the common conductor group, each adjustment relay having contacts for adjusting an electrical characteristic of its associated component and for closing a locking circuit for maintaining itself locked operated, the release relay having contacts for opening the locking circuit of any associated adjustment relay.

References Cited in the file of this patent

UNITED STATES PATENTS

| | | |
|---|---|---|
| 1,923,718 | Frink | Aug. 22, 1933 |
| 2,285,819 | Leathers | June 9, 1942 |
| 2,452,590 | McWhirter et al. | Nov. 2, 1948 |
| 2,690,548 | Joel | Sept. 28, 1954 |
| 2,738,504 | Gray | Mar. 13, 1956 |
| 2,775,754 | Sink | Dec. 25, 1956 |
| 2,870,429 | Hales | Jan. 20, 1959 |
| 2,953,772 | Coley | Sept. 20, 1960 |
| 2,974,306 | Femmer | Mar. 7, 1961 |

OTHER REFERENCES

Publication: Electronic Operations, EDPM Type 701, vols. 1 and 2, IBM Manual, Oct. 28, 1952.